(12) United States Patent
Yusim et al.

(10) Patent No.: US 12,451,662 B2
(45) Date of Patent: Oct. 21, 2025

(54) ULTRASHORT PULSE LASER SOURCE WITH CHIRPED PULSE AMPLIFICATION AND TAILORED PULSE TRAIN

(71) Applicant: IPG PHOTONICS CORPORATION, Oxford, MA (US)

(72) Inventors: Alex Yusim, Boston, MA (US); Igor Samartsev, Westborough, MA (US); Manuel J. Leonardo, Marlboro, MA (US); Vadim Smirnov, Orlando, FL (US); Pankaj Kadwani, Shrewsbury, MA (US); Alexey Avdokhin, Southborough, MA (US); Andreas Vaupel, Longmeadow, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 1096 days.

(21) Appl. No.: 17/427,135

(22) PCT Filed: Jan. 31, 2020

(86) PCT No.: PCT/US2020/016121
§ 371 (c)(1),
(2) Date: Jul. 30, 2021

(87) PCT Pub. No.: WO2020/160415
PCT Pub. Date: Aug. 6, 2020

(65) Prior Publication Data
US 2022/0149579 A1    May 12, 2022

Related U.S. Application Data

(60) Provisional application No. 62/864,834, filed on Jun. 21, 2019, provisional application No. 62/799,492, filed on Jan. 31, 2019.

(51) Int. Cl.
*H01S 3/00* (2006.01)
*H01S 3/067* (2006.01)
(Continued)

(52) U.S. Cl.
CPC ............ *H01S 3/0057* (2013.01); *H01S 3/005* (2013.01); *H01S 3/0092* (2013.01);
(Continued)

(58) Field of Classification Search
CPC ...... H01S 3/0057; H01S 3/005; H01S 3/0092; H01S 3/06758; H01S 3/06791;
(Continued)

(56) References Cited

U.S. PATENT DOCUMENTS

| 5,745,284 A | 4/1998 | Goldberg et al. |
| 6,198,568 B1 | 3/2001 | Galvanauskas et al. |

(Continued)

FOREIGN PATENT DOCUMENTS

| CN | 202093291 U | 12/2011 |
| JP | 2007317708 A | 12/2007 |

OTHER PUBLICATIONS

Dorrer, C. et al., "Single-shot high-resolution charazterization of optical pulses by spectral phase diversity," Opt. Express 23, 33116-33129 (2015).
(Continued)

*Primary Examiner* — M. A. Golub-Miller
(74) *Attorney, Agent, or Firm* — Caroline J. Roush, Esq.

(57) ABSTRACT

A laser system and method. In one example, the laser system includes an optical pulse stretcher configured to stretch pulse durations of an input train of input pulses to produce a train of stretched laser pulses, a pulse replicator module configured to increase a pulse repetition rate of the train of stretched laser pulses to produce a modified pulse train of laser light, a fiber power amplifier configured to amplify the
(Continued)

modified pulse train to produce amplified laser pulses, and a pulse compressor that temporally compresses the amplified laser pulses to produce amplified and compressed laser pulses. The system may further include a nonlinear frequency conversion stage comprising at least one nonlinear crystal.

12 Claims, 13 Drawing Sheets

(51) Int. Cl.
    *H01S 3/10*         (2006.01)
    *H01S 3/1106*      (2023.01)
    *H01S 3/1112*      (2023.01)

(52) U.S. Cl.
    CPC ...... *H01S 3/06758* (2013.01); *H01S 3/06791* (2013.01); *H01S 3/10046* (2013.01); *H01S 3/1112* (2013.01); H01S 3/06704 (2013.01); H01S 3/06745 (2013.01); H01S 3/1121 (2013.01)

(58) Field of Classification Search
    CPC ............... H01S 3/10046; H01S 3/1112; H01S 3/06704; H01S 3/06745; H01S 3/1121
    See application file for complete search history.

(56) References Cited

U.S. PATENT DOCUMENTS

| | | | |
|---|---|---|---|
| 7,817,684 B2 | 10/2010 | Nicholson | |
| 8,569,675 B1* | 10/2013 | Yap | H01S 5/041 |
| | | | 250/214 R |
| 8,730,568 B2* | 5/2014 | Tong | H01S 3/0057 |
| | | | 359/333 |
| 2005/0041702 A1* | 2/2005 | Fermann | B23K 26/0622 |
| | | | 372/25 |
| 2009/0046352 A1* | 2/2009 | Brunet | H01S 3/2316 |
| | | | 359/333 |
| 2009/0072811 A1* | 3/2009 | Marciante | G01R 29/027 |
| | | | 324/76.12 |
| 2009/0285245 A1* | 11/2009 | Liu | H01S 3/0057 |
| | | | 372/27 |
| 2010/0142034 A1 | 6/2010 | Wise et al. | |
| 2012/0217375 A1* | 8/2012 | Lin | H04B 10/508 |
| | | | 359/241 |
| 2012/0250705 A1 | 10/2012 | Tong et al. | |
| 2013/0034115 A1 | 2/2013 | Prawiharjo et al. | |
| 2014/0321492 A1* | 10/2014 | Lin | H01S 3/10023 |
| | | | 372/50.11 |
| 2017/0093111 A1 | 3/2017 | Hooker et al. | |
| 2020/0028316 A1 | 1/2020 | Hideur et al. | |
| 2022/0107224 A1* | 4/2022 | Hillier | G01R 29/02 |
| 2022/0294177 A1* | 9/2022 | Yusim | H01S 3/10046 |

OTHER PUBLICATIONS

Avdokhin et al., "High average power quasi-CW single-mode green and UV fiber lasers," Proc. SPIE 9347, Nonlinear Frequency Generation and Conversion: Materials, Devices, and Applications XIV, 934704 (Feb. 27, 2015).

Strickland, D. and Mourou, G., "Compression of Amplified Chriped Optical Pulses," Optics Communications, 56, 219-221 (1985).

Guo, Shu-Yen et al. "Pulse generation and compression using an asymmetrical porous silicon-based Mach-Zehnder interferometer configuration", Pramana—J Phys 87, 91 (2016).

Kerse, C. et al., "3.5-GHz Intra-Burst Repetition Rate Ultrafast Yb-Doped Fiber Laser", 366, pp. 404-409 (2016).

Seifert, B. et al., "A fiber Mach-Zehnder interferometer for the unique phase retrieval of ultrafast pulses with a 1 THz gap", Appl. Phys. B 99, 423-426 (2010).

* cited by examiner

ULTRASHORT PULSE LASER SOURCE WITH CHIRPED PULSE AMPLIFICATION AND TAILORED PULSE TRAIN

CROSS-REFERENCE TO RELATED APPLICATIONS

This application is related to provisional U.S. patent application Ser. No. 62/799,492, titled "ULTRASHORT PULSE LASER SOURCE WITH CHIRPED PULSE AMPLIFICATION AND TAILORED PULSE TRAIN" filed Jan. 31, 2019 and U.S. patent application Ser. No. 62/864,834, titled "ULTRASHORT PULSE LASER SOURCE WITH CHIRPED PULSE AMPLIFICATION AND TAILORED PULSE TRAIN" filed Jun. 21, 2019.

BACKGROUND

Technical Field

The technical field relates generally to laser systems, and more specifically to laser systems capable of generating laser light having a high average power with ultrashort pulses at high repetition rates.

Background Discussion

Lasers are used in a wide variety of industrial applications, with some laser systems capable of perform multiple material processing tasks such as cutting, drilling, measuring, and/or welding in one device. Laser systems having shorter wavelengths, shorter pulse durations, and high beam quality are becoming increasingly important in micromachining applications where the progressively smaller and more complex geometries require more sophisticated manufacturing processes. The shorter wavelengths and smaller spot sizes provided by ultraviolet (UV) laser systems allow for higher spatial resolutions and the ability to process transparent and reflective materials. The high energy absorption available at UV wavelengths combined with short pulse widths also minimizes the heat-affected zone (HAZ) and other thermal effects such as charring. Conventional methods for generating UV laser light include the use of excimer lasers, which are expensive and suffer from high maintenance costs.

SUMMARY

In accordance with one or more embodiments, a laser system is provided. The laser system comprises an optical pulse stretcher configured to stretch pulse durations of an input train of input pulses to produce a train of stretched laser pulses, a pulse replicator module optically coupled to the optical pulse stretcher and configured to increase a pulse repetition rate of the train of stretched laser pulses to produce a modified pulse train of laser light, a fiber power amplifier optically coupled to the pulse replicator module and configured to amplify the modified pulse train to produce amplified laser pulses, and a pulse compressor optically coupled to the fiber power amplifier and configured to temporally compress the amplified laser pulses to produce amplified and compressed laser pulses.

According to one example, the pulse replicator module includes at least two fused fiber optic couplers that comprise an input fused fiber optic coupler, an output fused fiber optic coupler, and at least one optical fiber delay line disposed between the input and output fused fiber optic couplers.

According to a further example, the pulse replicator module includes a plurality of stages that each include an optical fiber delay line such that each successive stage introduces a time delay to the modified pulse train, and a train of time-delayed replica pulses is provided as the modified pulse train at an output of the output fused fiber optic coupler. In one example, the time delay is increased or decreased by a predetermined amount at each successive stage. In another example, the predetermined amount of the time delay is different for at least one stage than for other stages of the plurality of stages.

In accordance with one example, the input train of input pulses have an initial pulse duration of less than one nanosecond and an initial pulse repetition rate of least one Megahertz (MHz). In another example, the optical pulse stretcher is configured to stretch the initial pulse duration to a pulse duration on the order of a few nanoseconds, and the amplified and compressed laser pulses have a pulse duration shorter than the initial pulse duration. According to another example, the pulse replicator module is configured to increase the pulse repetition rate of the train of stretched laser pulses to tens of MHz and multi-GHz levels.

In one example the laser system further comprises a passively mode-locked laser source configured to generate the input train of input pulses.

In accordance with another embodiment, a fiber-based laser system is provided. The fiber-based laser system comprises a mode-locked laser source configured to provide an input train of input pulses having an initial pulse duration of less than one nanosecond and a pulse repetition rate of at least one MHz, an optical pulse stretcher optically coupled to the mode-locked laser source and configured to stretch pulse durations of the input train of input pulses to produce a train of stretched laser pulses, a pulse replicator module optically coupled to the optical pulse stretcher and configured to increase a pulse repetition rate of the train of stretched laser pulses to produce a modified pulse train of laser light, a fiber power amplifier optically coupled to the pulse replicator module and configured to amplify the modified pulse train to produce amplified laser pulses, the amplified laser pulses having a peak-to-average power ratio of less than 30, and a pulse compressor optically coupled to the fiber power amplifier and configured to temporally compress the amplified laser pulses to produce amplified and compressed laser pulses.

According to one example, the system further comprises at least one nonlinear frequency conversion stage optically coupled to the pulse compressor and is configured to receive the amplified and compressed laser pulses for frequency conversion.

In one example, the nonlinear frequency conversion stage is configured to have a conversion efficiency of at least 15%.

According to one example the at least one nonlinear frequency conversion stage outputs ultraviolet (UV) laser light having an average power of at least 200 watts.

In accordance with at least one example, the input train of pulses have an initial pulse duration in a range of 10 fs to 100 ps and the amplified and compressed laser pulses have a pulse duration shorter than the initial pulse duration.

According to another example, the pulse replicator module includes at least two fused fiber optic couplers that include an input fused fiber optic coupler and an output fused fiber optic coupler and at least one optical fiber delay line disposed between the input and output fused fiber optic couplers. In accordance with a further example, the pulse replicator module includes a plurality of stages that each include an optical fiber delay line such that each successive stage introduces a time delay to the modified pulse train, and a train of time-delayed replica pulses is provided as the modified pulse train at an output of the output fused fiber optic coupler. In one example, the time delay is increased or decreased by a predetermined amount at each successive stage. In another example, the predetermined amount of the time delay is different for at least one stage than for other stages of the plurality of stages.

According to at least one example, the optical pulse stretcher is configured as a chirped fiber Bragg grating (CFBG) and the pulse compressor is configured as one of a chirped volume Bragg grating (CVBG), a Treacy configuration grating compressor, or a Martinez configuration.

In accordance with one example, the pulse compressor comprises at least one beam splitter and at least two volume Bragg gratings.

In one example, the mode-locked laser source is configured as a passively mode-locked fiber ring cavity. In a further example, the passively mode-locked fiber ring cavity is configured to generate giant chirped pulses as the input pulses.

In accordance with another aspect, a method is provided. The method comprises generating an input train of input pulses having an initial pulse duration of less than one nanosecond and a pulse repetition rate of at least one MHz, stretching the pulse duration of the input pulses to produce a train of stretched laser pulses, replicating the stretched laser pulses to generate a modified pulse train having a higher pulse repetition rate than a pulse repetition rate of the train of stretched laser pulses, amplifying the modified pulse train to produce amplified laser pulses, and compressing the amplified laser pulses to produce amplified and compressed laser pulses.

In one example, the method further comprises frequency converting the amplified and compressed laser pulses into ultraviolet light. According to one example, the method further comprises annealing an amorphous substrate material into a polycrystalline form with the ultraviolet light.

According to another example, the method further comprises providing a mode-locked laser source having a passively mode-locked fiber ring cavity configured to generate the input train of input pulses.

In one example, replicating the stretched laser pulses includes passing the stretched laser pulses through at least one pulse replicator module, the pulse replicator module including an input fused fiber optic coupler, an output fused fiber optic coupler, and at least one optical fiber delay line disposed between the input and output fused fiber optics couplers.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Many material processing applications can benefit from ultrashort pulsed laser light having a high repetition rate and high average power. For instance, reducing the pulse duration generally reduces the ablation threshold, which means that the required pulse energy decreases as the pulse duration decreases. Lower pulse energies lead to less unwanted heating, which can be important when processing heat-sensitive materials, such as organic polymers. Ultrashort laser pulses also trigger a photo-ablation mechanism instead of a photo-thermal interaction in which material is heated until it vaporizes. Photo-ablation involves removing material by directly breaking molecular bonds and therefore does not induce thermal effects. Many welding applications can also benefit from ultrashort pulsed laser energy characterized by lower energies per pulse, including laser welding of glass materials based on nonlinear absorption. High repetition rates not only increase the average power output for a train of ultrashort pulsed laser light, but also allow for faster processing speeds.

Figure 1:
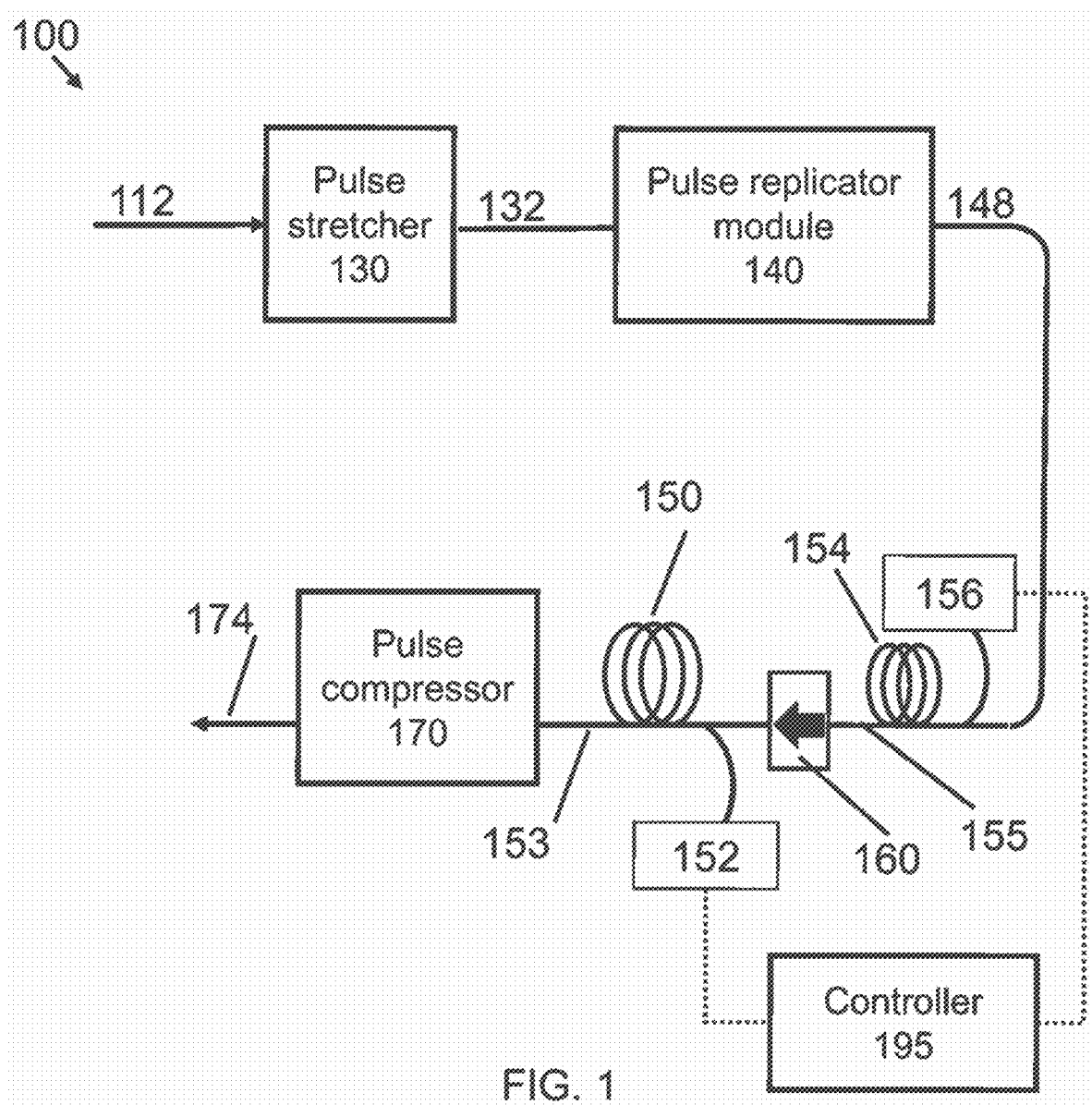
FIG. 1 is a schematic representation of a laser system in accordance with aspects of the invention.

Various aspects of the disclosure are directed to a laser system that combines chirped pulse amplification (CPA) in combination with pulse replication. Such systems are useful for producing laser light having high and ultra-high pulse repetition rates and non-damage inducing peak powers while still having a high average power. An example of such a system is shown in FIG. 1 and is indicated generally at 100. System 100 includes a pulse stretcher 130, a pulse replicator module 140, a fiber power amplifier 150, and a pulse compressor 170. Input laser pulses 112 are stretched in time using the pulse stretcher 130, amplified in an amplification stage that includes fiber power amplifier 150 and optionally preamplifier 154, and compressed using pulse compressor 170. Prior to amplification, the stretched pulses 132 are replicated using the pulse replicator module 140.

The input train of input pulses 112 can be sourced from any one of a number of different laser sources, including modulated CW lasers and seed-pulse sources. In some instances, the input pulses 112 are provided by a mode-locked laser source, including passively mode-locked laser sources. An example of a passively mode-locked fiber laser source is described below. Other types of lasers such as solid state lasers or semiconductor lasers may also be used. Other types of pulsed laser sources besides mode-locked lasers are also suitable, including Q-switched and gain switched lasers. According to some embodiments, the input pulses 112 have a pulse duration of less than one nanosecond, and can be on the order of picoseconds (ps) or femtoseconds (fs). The input pulses 112 also have an initial pulse repetition rate of at least one MHz.

The pulse stretcher 130, fiber power amplifier 150, and pulse compressor 170 comprise components of the CPA system. The temporal stretching and compression of the pulse are based on delaying different wavelengths in the pulse by different amounts of time. In the stretcher 130, the short wavelength pulses may be delayed with respect to the long wavelength pulses or vice versa and, in the compressor 170, this effect is undone again. Bulk gratings, prisms, fiber, chirped fiber Bragg gratings (CFBG), or chirped volume Bragg gratings (CVBG) are examples of strongly dispersive elements that function to stretch the pulses.

Pulse stretcher 130 is configured to stretch pulse durations of the input train of pulses 112 to produce a train of stretched pulses 132 having a reduced peak power. According to some embodiments, the pulse stretcher 130 stretches pulses of the initial pulse train 112 to a pulse duration on the order of a few nanoseconds, and in some instances can be 10 ns. In other embodiments, the pulses of the initial pulse train 112 are stretched to a pulse duration in a range of about 100 ps to 1 ns.

The repetition rate of the stretched laser pulses 132 can be increased by the pulse replicator module 140, which replicates the optical waveform of the stretched laser pulses 132 in time to generate a modified pulse train 148. The temporal plot of the train of stretched laser pulses 132 output by pulse stretcher 130 have a pulse period of t and a pulse repetition rate of 1/t. According to some embodiments, the pulse replicator 140 can be used to replicate the stretched laser pulses such that t is decreased to a degree where the laser energy of the modified pulse train 148 appears continuous. The nearly continuous-wave characterization of modified pulse train 148 is a function of both the stretching performed by the pulse stretcher 130 and the replication performed by the pulse replication module 140. An example of a system utilizing such laser light is discussed in further detail below. The pulse replicator 140 can be configured to increase the repetition rate of the stretched laser pulses 132 to tens of MHz and multi-GHz levels. The pulse stretcher 130 and/or the pulse replicator module 140 can be configured to generate modified pulses 148 having a desired peak-to-average power ratio. An example is discussed below. Increasing the repetition rate has beneficial aspects for annealing applications. For one thing, the individual pulse energy is reduced, which reduces the likelihood of damage to unprocessed material. However, the efficiency of non-linear frequency conversion is proportional to peak power, i.e., high peak power results in higher conversion efficiency. Secondly, as the repetition rate increases, the time between laser pulses becomes shorter than the time for the absorbed laser radiation to diffuse out of the treatment site, which allows heat to build up, i.e., at higher repetition rates the sample does not have the time to cool down between pulses. It is therefore desirable to have the cooling time of the laser-irradiated surface be longer than the time between successive pulses. The pulse replicator module can be tailored, as explained in further detail below, to output laser pulses that achieve a balance between non-damaging, yet high conversion efficiency peak powers in combination with effective repetition rates.

The pulse replicator module 140 is an all fiber device comprising at least two fiber optic couplers that include an input fused fiber optic coupler and an output fiber optic coupler and at least one optical fiber delay line disposed between the input and output fused fiber optic couplers. All fiber optic couplers are polarization maintaining. The fiber optic couplers may also be configured as single-mode (SM) non-polarization-maintaining fused fiber optic coupler. The pulse stretcher 130 and components of the pulse replicator module 140 can be configured to output pulses at a tailored (high) repetition rate. Non-limiting examples of pulse replicators are described below in reference to FIGS. 4 and 5.

The fiber power amplifier 150 of system 100 in FIG. 1 is used to amplify the laser pulses of the modified pulse train 148 from the pulse modulator 140. In this example, a preamplifier 154 is provided to receive and amplify the modified laser pulses 148 to produce pre-amplified laser pulses 155. Fiber power amplifier 150 is provided to further amplify the modified laser pulses to produce amplified laser pulses 153. In some implementations the preamplifier 154 may be eliminated so that the modified pulses 148 are fed directly into fiber power amplifier 150 for amplification. The preamplifier 154 and amplifier 150 are implemented with doped optical fibers, which make the system compact, robust, and of low cost. An optical isolator 160 is also disposed between the pulse replicator module 140 and the fiber power amplifier 150.

The pulse compressor 170 compresses the pulse width of the chirped amplified pulses 153. Non-limiting examples of pulse compressors include grating compressors such as CVBGs and Treacy compressors, as well as Martinez and prism compressors.

The amplified and compressed laser pulses 174 output from the pulse compressor 170 can be characterized as ultrashort pulsed laser light having a high repetition rate and high average power. A specific application for this output includes the generation of high average power UV laser radiation and is discussed below.

High average power (i.e., on the order of watts) UV laser radiation may be used for a variety of industrial applications related to surface modifications, material processing, and inspection, including laser direct imaging (LDI), solar cell manufacturing, wafer scribing and patterning, annealing process such as low temperature polycrystalline (LTPS) display annealing, laser lift-off (LLO), and semiconductor wafer and mask inspection. As used herein, UV refers to radiation with wavelengths in the range of 335 nm to 370 nm. As acknowledged above, conventional methods for generating UV laser light include the use of excimer lasers, which suffer from various deficiencies. In accordance with at least one embodiment, the methods and systems described herein may be used to anneal an amorphous substrate material into a polycrystalline form with the ultraviolet light.

Conventional continuous-wave (CW) fiber lasers are capable of providing very high average power of near infrared light with single-mode (SM) beam quality, which can be converted into UV light using nonlinear optical crystals. As used herein, the terms "single mode" and "multimode" (MM) refer to transverse modes. Efficient frequency conversion requires using a laser source having either a narrow bandwidth and/or a high peak power. Conventional CW fiber lasers with narrow bandwidths are limited in power and reliability due to nonlinear effects such as stimulated Brillouin scattering (SBS) and modal instabilities (MI).

Pulsed fiber laser systems configured with a narrow linewidth seed laser source are also limited by the same nonlinear effects mentioned above. In addition, the narrow linewidth increases spatial noise and interference effects for certain applications. Using a broader linewidth seed laser source such as a mode-locked fiber laser reduces the spatial noise and beam interference effects, but introduces other problems. For instance, other nonlinear effects such as self-phase modulation (SPM), stimulated Raman scattering (SRS), and four-wave mixing (FWM) are introduced when these broader linewidth laser sources are directly amplified, which in turn limits the peak power. To attain good frequency conversion, the laser beam is tightly focused in the nonlinear crystal and the resulting high optical intensity reduces the crystal lifetime. Indirect amplification of the broader linewidth laser source, such as through chirped pulse amplification (CPA) methods, results in higher peak power values, but these are limited in the fiber amplifier due to the same nonlinear effects experienced via direct amplification, i.e., SPM, SRS, and FWM. Furthermore, certain applications require low peak powers in the UV wavelength range for purposes of avoiding damage to unprocessed material.

Aspects of this disclosure are intended to address and overcome many of the issues raised above regarding the ability to generate high average power UV laser light. Aspects of the disclosed systems and methods utilize a fiber-based laser system having a mode-locked laser source operated in combination with CPA and a pulse replicator module. The mode-locked laser source provides ultrashort pulses in the sub-nanosecond regime at a high pulse repetition rate, i.e., at least 1 MHz. The sub-nanosecond pulses can be stretched in time via an optical chirp around a predetermined central wavelength using a pulse stretcher and replicated using the pulse replicator module to pulse durations and repetition rates that simulate a nearly CW configuration. This reduces the peak power and alleviates the issues associated with optical nonlinearities such as SPM, SRS, and FWM. These modified laser pulses are amplified in an amplifier, and after amplification, the pulses are compressed back down to pulse durations in the sub-nanosecond regime, thereby increasing the peak power for enhanced frequency conversion efficiency. The stretching and the repetition rate of the stretched pulses can be tailored such that the peak power is low enough to avoid damage to nonlinear materials and/or unprocessed material but is still high enough to ensure efficient frequency conversion. At the same time, the repetition rate is high enough such that the sample does not have time to cool down between pulses, which is important in annealing applications.

Figure 2:
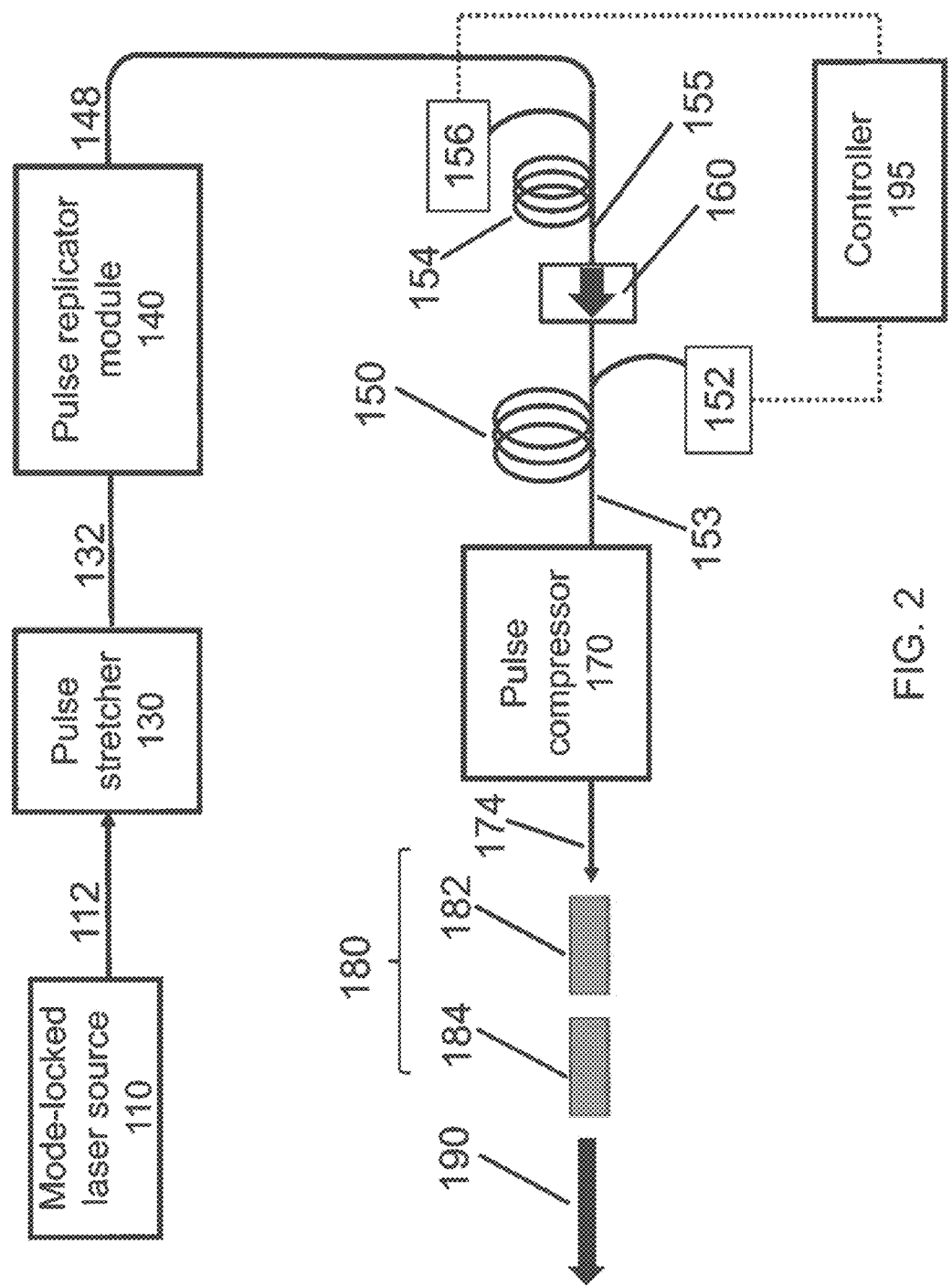
FIG. 2 is a schematic representation of a fiber-based laser system in accordance with another aspect of the invention.

One example of a fiber-based laser system in accordance with aspects of the invention is shown generally at 200 in the schematic representation depicted in FIG. 2. The term "fiber-based" or "fiber" laser as used herein refers to a laser having a significant number of fiber elements used to transmit light energy, including within the individual components, or at least an input or output of a laser component. System 200 includes CPA and pulse replication components similar to those included in system 100 of FIG. 1, and also includes a laser source and frequency conversion stage. According to this example, system 200 includes a mode-locked laser source 110, a pulse stretcher 130, a pulse replicator module 140, a fiber power amplifier 150, a pulse compressor 170, and at least one nonlinear frequency conversion stage 180.

The mode-locked laser source 110, which may also be referred to herein as a pulse generator, is configured to provide an input train of input pulses 112 having an initial pulse duration (as measured at the full-width-half-maximum) of less than one nanosecond and a pulse repetition rate of at least one MHz. The term "mode-locked" generally refers to a laser source where resonant longitudinal modes of the laser cavity are synchronized in phase, i.e., phase-locked together, so as to produce a train of light pulses. As a result of mode-locking, the lasing (longitudinal) modes interfere and a laser is caused to produce light output in the form of laser pulses of very short duration, e.g., the sub-nanosecond regime which in some instances can be on the order of picoseconds or femtoseconds.

Mode-locking methods can be divided into two classes: active and passive, and the embodiments discussed herein pertain to the passive class of mode-locked fiber lasers. The most commonly used architectures carrying output passive mode-locking include saturable absorbers, non-linear polarization rotation (NPR), and interferometric structures, all of which are rooted in nonlinear optics and explained by various nonlinear effects. Certain passive architectures use a real absorber in the form of semiconductor saturable absorber or mirror (SESAM). At least one limitation of SESAMs lies in their damage threshold, particularly in a 1 µm wavelength range. SESAMs may also be unreliable due to poor chirp-to-chirp reproducibility, and often manufacturing defects can only be identified after they have been placed within the resonant cavity.

Both NPR and interferometric passive mode-locking architectures are associated with a fiber laser provided with a ring resonator. In particular, these architectures are operated to create conditions favorable for acquisition of narrow pulse widths due to the self-phase modulation (SPM) nonlinear effect. While NPR systems are capable of generating ultrahigh energy pulses, the polarizing controllers require complicated feedback with fine control systems and the NPR process is sensitive to environmental changes and packaging conditions. As a result, it is difficult to satisfy periodicity conditions, i.e., reproducibility of pulse characteristics at a consistent location after each round trip of the laser in the cavity.

In accordance with various embodiments, the mode-locked laser source 110 is configured as a mode-locked fiber laser source, including passively mode-locked fiber laser sources. In one embodiment, the mode-locked laser source 110 is configured as a passively mode-locked fiber ring cavity. Such passive mode-locking configurations rely on the presence in the ring cavity of at least one component that has a nonlinear response to increasing peak intensity. A specific example of such a configuration is discussed further below. Other types of lasers besides fiber lasers are also within the scope of this disclosure, including solid state and semiconductor lasers. The mode-locked laser source 110 emits SM input pulses 112 in a 1 μm wavelength range.

According to alternative embodiments, a harmonically mode-locked laser source may be used as the laser source 110. Such a device is capable of producing pulse trains with high pulse repetition rates in the gigahertz and multi-gigahertz regime, and therefore the pulse replicator module 140 may be removed. These laser sources however rely on having multiple pulses at one time in the laser cavity which leads to pulse to pulse jitter and supermodes, and therefore mode suppression and jitter control are needed, which add complexity and cost to the system.

The pulse repetition rate of a mode-locked laser is inversely proportional to its resonator length, and therefore longer cavities yield lower pulse repetition rates and, consequently, to higher pulse energy at the same average output power. The mode-locked laser source 110 has a relatively long cavity length to produce low repetition rates. In accordance with various embodiments, the mode-locked laser source 110 provides an input train 112 of input pulses having an initial pulse repetition rate of at least one MHz. According to some embodiments, the input train 112 has a pulse repetition rate in a range of 5 MHz to about 15 MHz. The input pulses of the input train 112 have an initial pulse duration of less than one nanosecond. According to some embodiments, the input pulses 112 have an initial pulse duration in the femtosecond (fs) to picosecond (ps) range. For example, in some applications the input pulses 112 have an initial pulse duration in a range of 10 fs to 100 ps, and in some instances the initial pulse duration is a few ps. According to another aspect, the time interval between pulses in the input train 112 has a minimum value of 50 ns, and in certain instances has a minimum value of 10 ns.

Pulse stretcher 130 imposes a unidirectional linear chirp on the optical pulses and their length by more than a factor of 10. According to at least one embodiment, the pulse stretcher 130 stretches pulses of the initial pulse train 112 to a pulse duration in a range of 50 ps to 5 ns. In another embodiment, the pulses of the initial pulse train 112 are stretched to a pulse duration in a range of about 100 ps to 1 ns. In some embodiments, the pulse stretcher 130 generates stretched pulses having a duration on the order of hundreds of ps.

Figure 3:
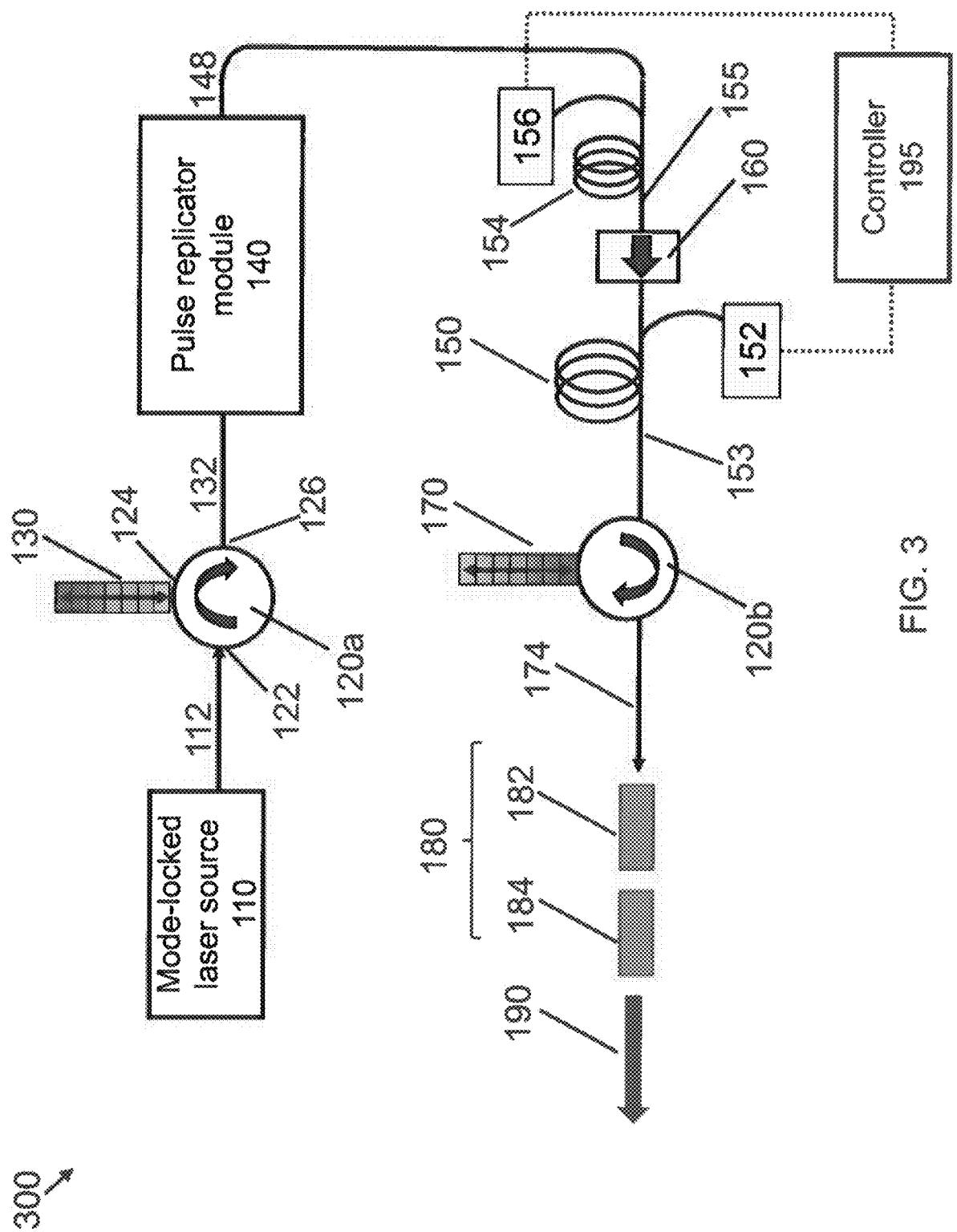
FIG. 3 is another schematic representation of a fiber-based laser system in accordance with aspects of the invention.

In one embodiment, the pulse stretcher 130 is configured as a linear CFBG mounted to a pigtailed circulator 120a, as shown in FIG. 3, which has the advantage of compact size and alignment insensitivity. The initial pulse train 112 is routed via the optical circulator 120a from the entry port 122 to the CFBG stretcher 130 connected to circulator port 124. The optical circulator 120a directs the reflected light back, where it exits the circulator at port 126 as a train of stretched laser pulses 132. According to alternative embodiments, a fiber coupler may be used in conjunction with the CFBG.

In alternative implementations, the optical circulator 120a of FIG. 3 can be replaced with a simple polarization beam splitter and quarter-wave plates to transfer the beam from port 122 via port 124 to port 126. Such implementations are well known in the state of the art and are not shown here. As yet another alternative, a solid-core, a holey, or air-hole fiber can be incorporated as a pulse stretcher.

Although not explicitly shown in FIGS. 1-3, the input pulses 112 can be passed through a spectral filter to reduce the optical bandwidth. In systems 200 and 300 of FIGS. 2 and 3 for example, a spectral filter can be disposed downstream from the mode-locked laser source 110. In some implementations the input pulses may have a width of 1-50 nm, and according to at least one embodiment, the linewidth of the input pulses 112 can be reduced by the spectral filter to less than 5 nm, and in some instances may be about 1 nm. According to one embodiment, the CFBG stretcher 130 itself can be configured to reduce the optical bandwidth of the input pulses 112.

The repetition rate of the stretched laser pulses can be increased to tens of MHz and multi-GHz levels by the pulse replicator module 140. In certain embodiments, the pulse repetition rate may be between 100 MHz and 50 GHz. According to various aspects, the laser energy of the modified pulse train 148 appears continuous. The nearly continuous waveform is created by filling in the temporal gaps, and the peak-to-average power ratio is reduced, which also decreases SRS and SPM effects. In one embodiment, the time interval between pulses in the modified pulse train 148 has a maximum value of 10 ns, and in some instances is 1 ns or less than 1 ns. In accordance with at least one embodiment, the peak-to-average power ratio (PAPR) of the modified pulse train 148 has a value that is less than a predetermined threshold or maximum value. According to one embodiment, this threshold may be less than 30, and in some embodiments may be less than 25 and in other instances may be less than 20. The PAPR is a function of the pulse width and repetition rate, and the upper limit is therefore indicative of suitable values for these parameters that also reflect peak powers that are lower than the damage threshold to the fiber. Examples of suitable parameter values are described below.

Figure 4:
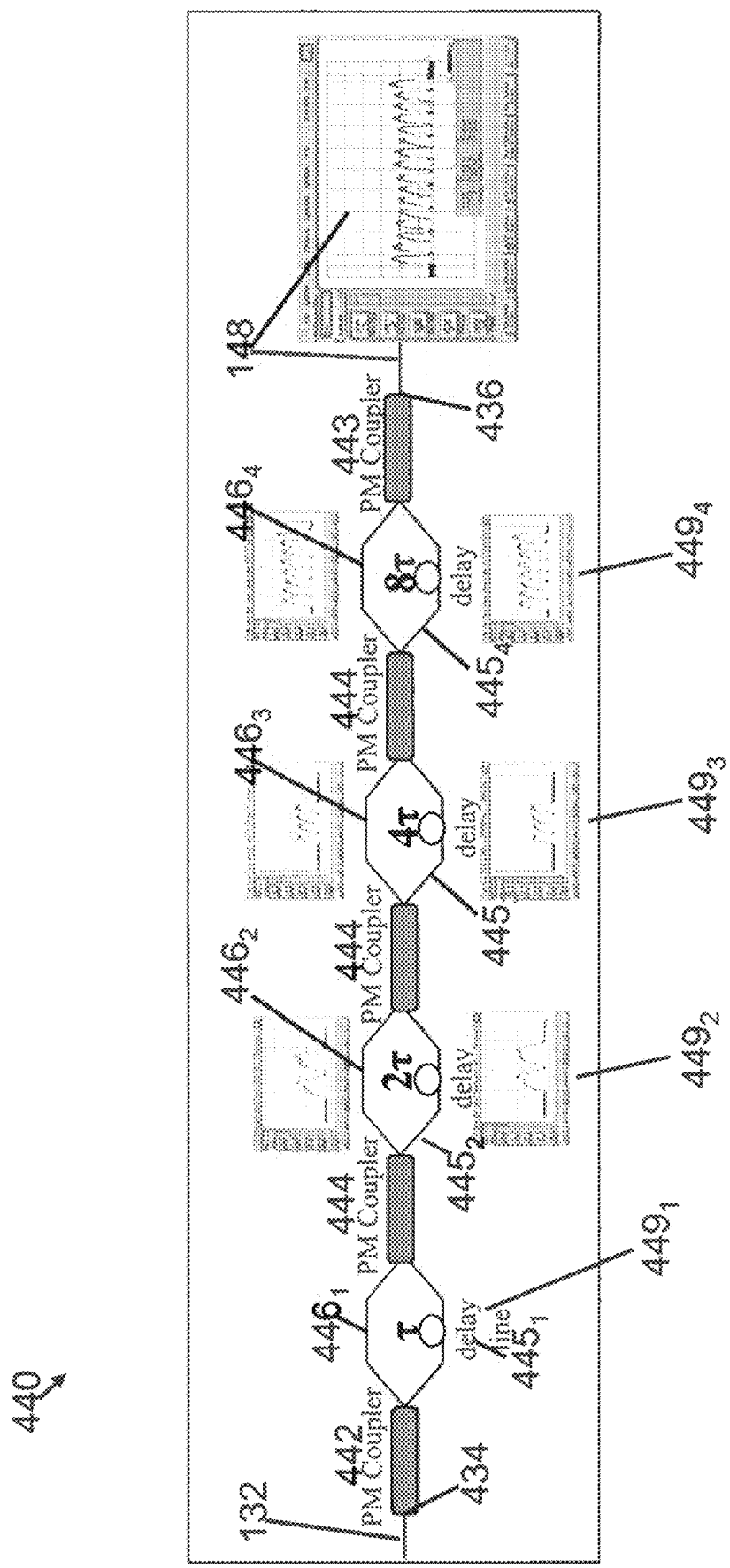
FIG. 4 is a schematic representation of one example of a pulse replicator module in accordance with aspects of the invention.

FIG. 4 is a schematic representation of a first example of a pulse replicator module 440. According this configuration, the input fused fiber optic coupler 442 is configured as a fiber optic splitter. One of the two fibers exiting the coupling region of output fiber optic coupler 443 forms the output 436 that contains the modified pulse train 148. The optical beam splitter 442 has an input 434 and in this instance input 434 is connected to or is otherwise coupled to the optical pulse stretcher 130, and the output 436 of the output coupler 443 is connected to or otherwise coupled to the fiber power amplifier 150 (see FIGS. 1, 2, and 3). The pulse replicator module 440 also includes and at least one fiber optic coupler 444 disposed between the input coupler 442 and the output coupler 443, with the example shown in FIG. 4 including three such couplers.

To one of the outputs of the input splitter 442 a delay τ is added using an appropriate length of single-mode fiber (i.e., optical fiber delay line 445) such that one leg or output segment (445) of the pair has an optical path length that is different (longer) than the other leg 446. This produces two pulses separated by τ at both output fibers $445_1$ and $446_1$ of splitter 442. A delay of 2τ is then put into one of these paths to produce two sets of four pulses when these two outputs are combined in coupler 444. This process can be repeated by doubling the differential delay between the two paths until a desired number of replicas is obtained. The two paths are then combined using combiner 443. The length of the delay τ can be chosen to be slightly longer than the length of the laser pulses to avoid the pulses overlapping and interfering.

The pulse replicator 440 comprises a plurality of stages 449 that each include an optical fiber delay line 445 such that each successive stage introduces a time delay to the stretched laser pulses 132. For the example shown in FIG. 4, the pulse replicator 440 includes four stages $449_1$, $449_2$, $449_3$, and $449_4$, where at each stage the signal power is divided and recombined with a fixed time delay. Since the number of replicas is doubled at each stage 449 (i.e., 50:50 couplers), the two outputs $445_4$ and $446_4$ propagating into combiner 443 each contain $2^x$ replicas, where x is the number of stages used (in this example, x=4). The pulse replicator 440 is thus configured as a multi-stage passive pulse replicator where each successive stage introduces a fixed time delay to the stretched laser pulses 132. The time delay can increase or decrease by a predetermined amount at each successive stage.

The outputs of the last stage $445_4$ and $446_4$ of replicator 440 are combined in combiner 443 to generate a train of time-delayed replica pulses as the modified pulse train 148 at output 436. As can be seen in FIG. 4, each of the 8 replica pulses of fiber legs $445_4$ and $446_4$ are combined in combiner 443 to generate 16 pulses. These 16 pulses are configured as a burst of pulses, and the modified pulse train 148 would thus include a sequence of bursts of pulses that each include 16 pulses. The length of the delay lines $445_1$-$445_4$ dictate the burst repetition rate (i.e., the time interval between bursts).

Figure 5:
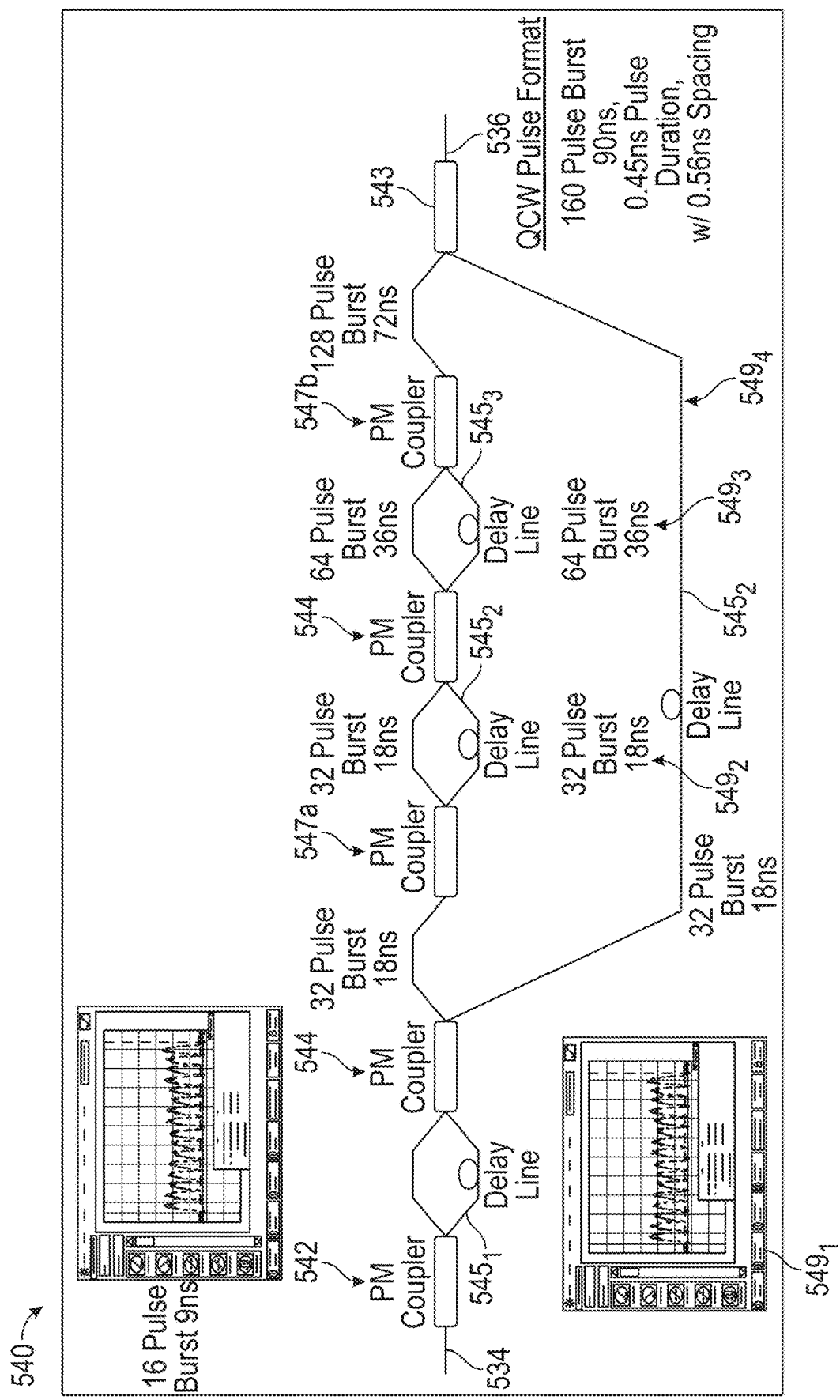
FIG. 5 is a schematic representation of another example of a pulse replicator module in accordance with aspects of the invention.

As will be appreciated, the pulse stretcher 130 and components of the pulse replicator module 140 can be configured to output pulses at a tailored repetition rate. The repetition rate can be chosen such that peak powers are low enough to avoid undesirable damage and yet sufficiently high enough for efficient frequency conversion, and high enough to provide effective processing results, e.g., in annealing applications. The fiber couplers and fiber delay lines of the pulse replicator module can be used to create various pulse formats, and FIG. 5 is a schematic representation of another example of a pulse replicator module 540. According to some embodiments, the pulse replicator module can include a sequence of submodules that may each be configured separately. For instance, the pulse replicator module 540 shown in FIG. 5 uses as input the output from the pulse replicator module 440 of FIG. 4, but it is to be appreciated that replicator module 540 can also be used on its own or in combination with submodules having other configurations.

In a similar manner as replicator module 440 of FIG. 4, pulse replicator module 540 also includes an input fused fiber optic coupler 542 and an output fiber optic coupler 543. In between the input coupler 542 and the output coupler 543 are intermediary fiber couplers (544), (547a), and (547b). Instead of having the delay lines from each stage 549 being directed to the adjacent (downstream) stage, at least one delay line bypasses one or more downstream stages, as shown in the configuration of FIG. 5. According to this example, delay line $545_4$ is directed from intermediary coupler 544 at the output of the first stage $549_1$ to output combiner 543, and thereby bypasses second and third stages $549_2$ and $549_3$ and forms the delay line of fourth stage $549_4$. As such, the time delay increases that are introduced at each successive stage are not all equal to one another. As indicated in FIG. 5, this configuration allows for an initial 16 pulse burst having a total duration (envelope) of 9 ns to be converted via four stages $549_1$-$549_4$ to a 160 pulse burst having an envelope of 90 ns, where each pulse duration is 0.45 ns and the pulses are separated by 0.56 ns. Table 1 below outlines each stage.

TABLE 1

Stages of Pulse Replicator Module 540 of FIG. 5

|  | Stage 1 ($549_1$) | Stage 2 ($549_2$) | Stage 3 ($549_3$) | Stage 4 ($549_4$) |
| --- | --- | --- | --- | --- |
| Input 1 | 16 pulse burst 9 ns envelope | 32 pulse burst 18 ns envelope | 64 pulse burst 36 ns envelope | 128 pulse burst 72 ns envelope |
| Input 2 | N/A | N/A | 64 pulse burst 36 ns envelope | 32 pulse burst 18 ns envelope |
| Output 1 | 32 pulse burst 18 ns envelope | 64 pulse burst 36 ns envelope | 128 pulse burst 72 ns envelope | 160 pulse burst 90 ns envelope |
| Output 2 | 32 pulse burst 18 ns envelope | 64 pulse burst 36 ns envelope | N/A | N/A |

It is to be appreciated that the examples of the pulse replicators shown in FIGS. 4 and 5 are not meant to be limiting and other configurations are also within the scope of this disclosure.

In accordance with at least one embodiment, one or more components of system 200 can be configured to generate bursts of pulses. For instance, the pulse generator 110, pulse stretcher 130, or pulse replicator 140 can be configured to generate bursts of pulses.

Figure 6:
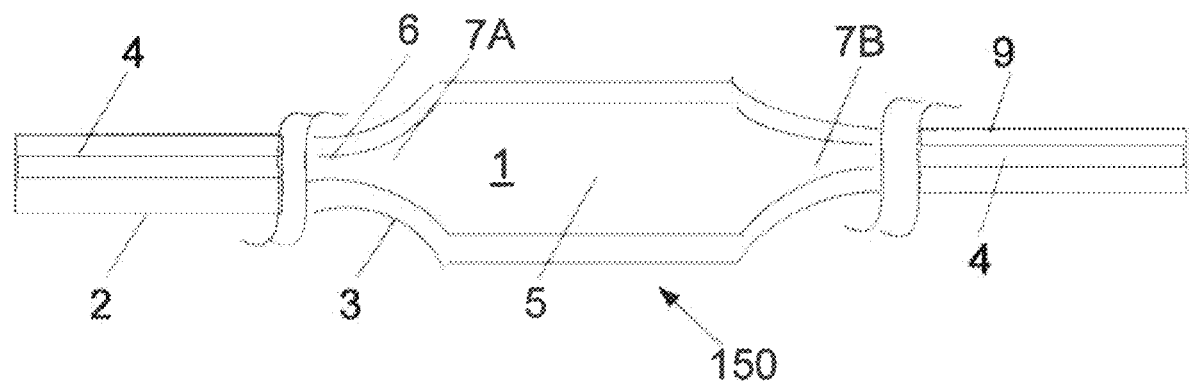
FIG. 6 is a schematic representation of an active fiber used in an amplifier in accordance with aspects of the invention.

Returning now to FIGS. 1-3, the preamplifier 154 and amplifier 150 operate in the 1-2 μm range and are respectively pumped by pumps 156 and 152 which can be driven by one or more pump drivers in a controller 195. The controller 195 includes hardware (e.g., a general purpose computer) and software that may be used in controlling components of the system, including the pumps 156 and 152. The pumps 156 and 154 can be implemented by SM or MM laser diodes or fiber laser pumps that operate in the CW mode and can be arranged in a side-pumping or end-pumping configuration. According to some embodiments, modified laser pulses 148 are SM light that are delivered via SM passive fiber to active fiber of amplifier 150 having a MM core doped with one or more rare earth ions, such as ytterbium, erbium, and/or thulium, and surrounded by at least one cladding. Referring to FIG. 6, fiber power amplifier

150 may be configured with a monolithic (one-piece) MM core 1 extending between the opposite ends of the amplifier that supports multiple transverse modes and is surrounded by at least one cladding 3. The core 1 is configured to support only a single, fundamental mode at the desired fundamental wavelength. This is realized by matching a mode field diameter (MFD) of MM core 1 to that of both a SM passive fiber 2 that guides modified laser light 148 along its core 4, and to an output passive SM fiber 9. When side-pumped, pump light from pump 156 is coupled to the central core region 5.

For purposes of further increasing the threshold for optical nonlinear effects, core 1 has a double bottleneck-shaped cross-section, as shown in FIG. 6. A uniformly-dimensioned input core end 6 can have a geometrical diameter equal to that of SM core 4 of passive fiber 2. When SM light at the fundamental wavelength is coupled into the input end 6 of the core, it excites only a fundamental mode whose intensity profile substantially matches a Gaussian intensity profile of the pure SM. The core 1 further includes a large diameter uniformly dimensioned mode transforming core part 5 that receives the guided fundamental mode through an adiabatically expanding mode transforming core region 7A. The large diameter of central core region 5 allows receiving greater amplifier pump powers without, however, increasing a power density within this part which raises a threshold for optical nonlinear effects such as SPM, SRS, and FWM. The output mode transforming core region 7B may be configured identically to core region 7A to adiabatically reduce the mode field diameter of amplified pump light at the fundamental frequency. The amplified SM light is then coupled into the output SM passive fiber 9.

Referring back to FIG. 2, in accordance with various embodiments the peak-to-average power ratio (PAPR) of the amplified laser pulses 153 has a value that is less than a predetermined threshold value. Similar to the peak-to-average power ratio of the modified pulse train 148, the threshold value for the peak-to-average power ratio of the amplified laser pulse 153 may be less than 30. According to other embodiments, the threshold value may be less than 25, and in some instances may be less than 20. Taking for example, a threshold PAPR value of 30, and a repetition rate of 100 MHz, the stretched pulse duration can be in a range from 333 ps to 10 ns. With a repetition rate of 1 GHz, the stretched pulse duration can be in a range from 33 ps to 1 ns. These values also keep the peak power at a value below 500 kW, which is the damage threshold value of the fiber for certain applications. Some applications may require even lower peak power values.

In accordance with another aspect, one or more fibers of systems 100 and 200 (and 300) is provided as a large effective mode area (LMA) fiber. For instance, the power fiber amplifier 150 and/or pre-amplifier 154 may be configured as an LMA fiber that is side pumped or end pumped by laser diodes or fiber lasers.

Returning to FIG. 2, the chirped amplified pulses 153 are compressed by the pulse compressor 170. Due to the presence of the pulse replicator, the compressor 170 actually compresses the laser pulses to a duration that is shorter than the initial pulse duration (prior to stretching). In at least one embodiment, the pulse compressor 170 compresses the pulses to a duration of about 1 ps. In accordance with some embodiments, the pulse compressor 170 compresses the pulses to a duration in a range of about 1 ps to about 25 ps. The compressed laser pulses may have a pulse repetition rate similar to that of the amplified pulses 153.

According to some embodiments, the pulse compressor 170 is configured as a CVBG, as shown in FIG. 3 and can be scaled in one or more dimensions to accommodate larger beam sizes. In some embodiments, the compressor 170 is configured with transmission gratings capable of handling high average powers. For instance, the transmission gratings may be formed from silica using holographic procedures and etching processes tailored to minimize defects and imperfections.

Figure 7:
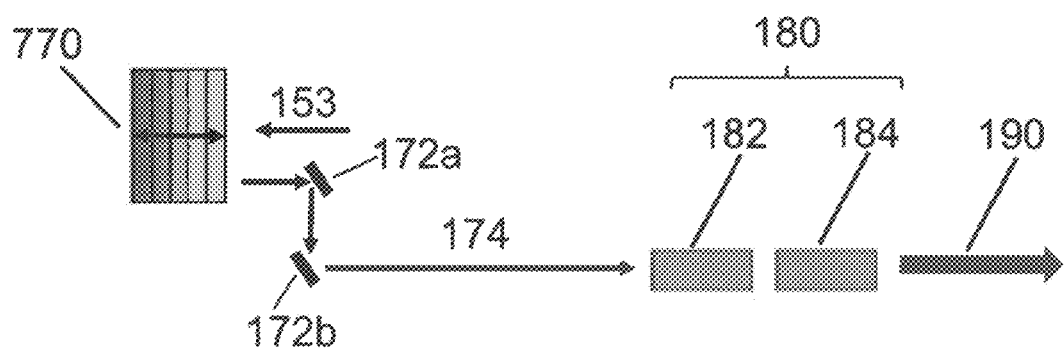
FIG. 7 is a schematic representation of one example of a pulse compressor configuration in accordance with aspects of the invention.
Figure 8:
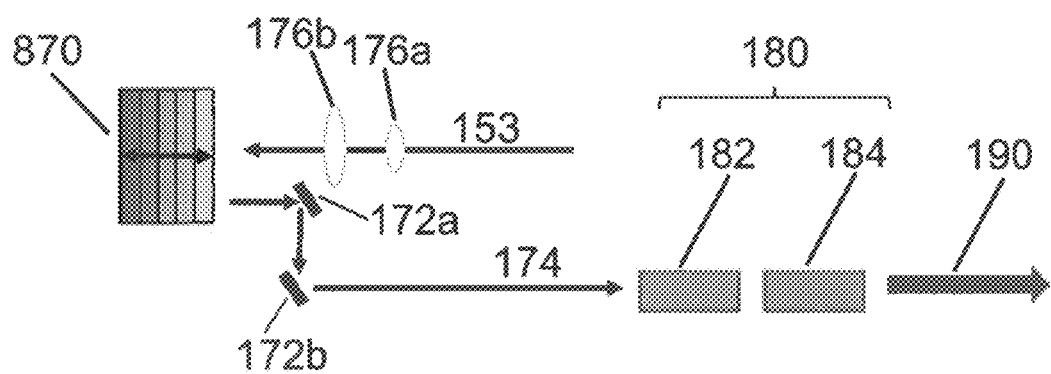
FIG. 8 is schematic representation of another example of a pulse compressor configuration in accordance with aspects of the invention.
Figure 9:
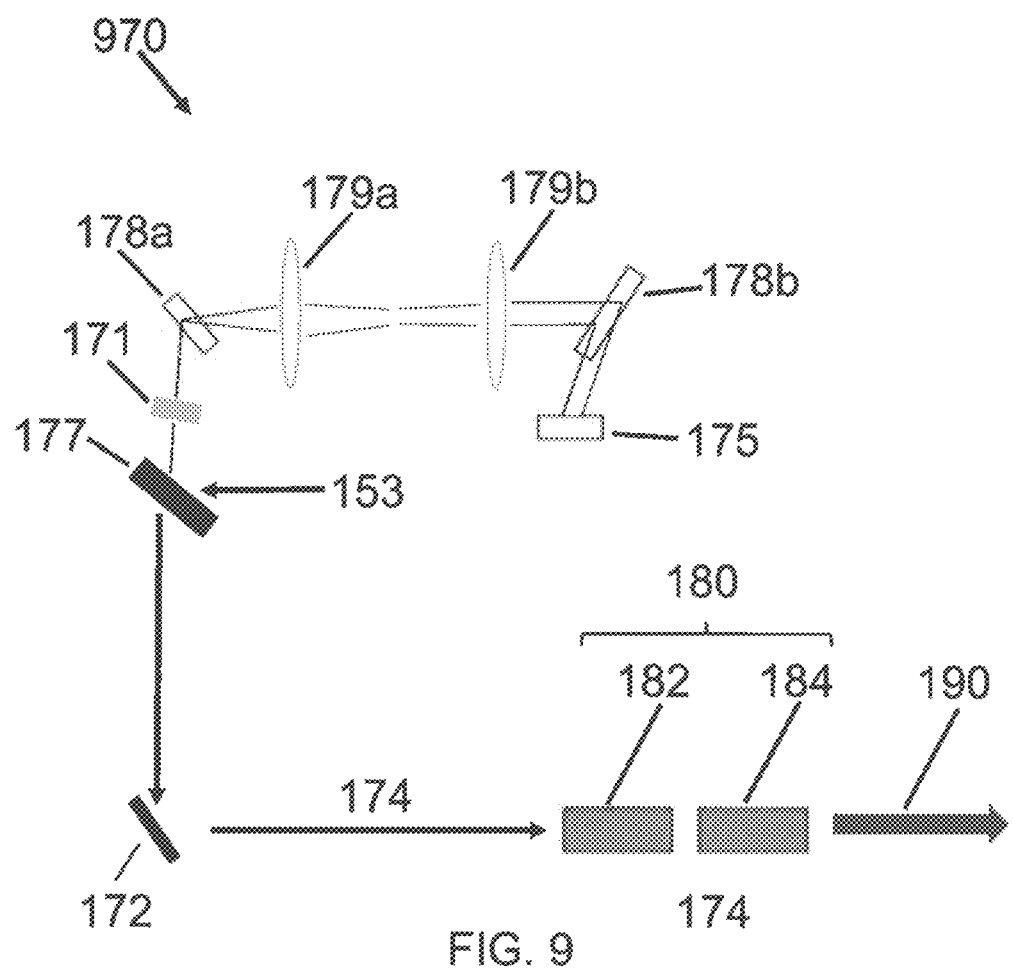
FIG. 9 is a schematic representation of yet another example of a pulse compressor configuration in accordance with aspects of the invention.

FIG. 7 illustrates one example of the use of a CVBG compressor 770 for compressing amplified pulses 153. The transmission path between the CVBG compressor 770 and the nonlinear frequency conversion stage 180 may include mirrors 172a and 172b as depicted, or may involve other variations such as fiber-optics, more or fewer mirrors, prisms, lenses, or other suitable optical elements. For instance, FIG. 8 illustrates another example of the use of a CVBG compressor 870 that may be used for compressing amplified pulses 153 and includes lenses 176a and 176b that are used for focusing. FIG. 9 illustrates a Martinez configuration for the pulse compressor, which is indicated generally at 970 and includes a polarizer 177, a quarter waveplate 171, first grating 178a, a first lens 179a, a second lens 179b, a second grating 178b, and a mirror 175.

In some embodiments, the pulse compressor 170 is configured to limit or otherwise minimize thermal lensing issues at higher average powers. For instance, the compressor can be a VBG constructed from photo-thermorefractive glass (PTG) that is configured with 2D or 3D absorption profiles in the transverse direction. Portions of the laser beam output having the greatest intensity (e.g., peak region) can propagate through areas of the grating having minimal absorption, and lower intensity portions of the laser beam (e.g., shoulders) can propagate through grating areas having higher absorption.

In accordance with another aspect of the invention, the pulse compressor 170 itself, especially when configured as a VBG, may experience thermal lensing issues at high average powers. To get around this, the output beam 153 from the amplifier 150 containing the amplified pulses can be split into multiple lower power beams, compressed using multiple VBGs, and then recombined. In some embodiments, the pulse compressor 170 comprises at least one beam splitter and at least two volume Bragg gratings.

Figure 14A:
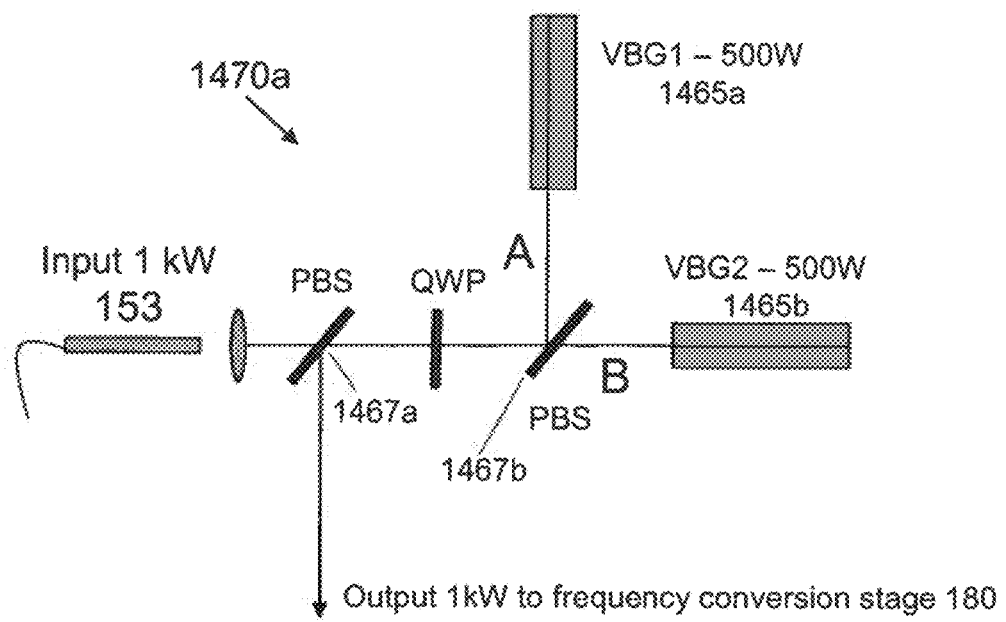
FIG. 14A is a schematic representation of one example of a pulse compressor using volume Bragg gratings (VBG) in accordance with aspects of the invention.
Figure 14B:
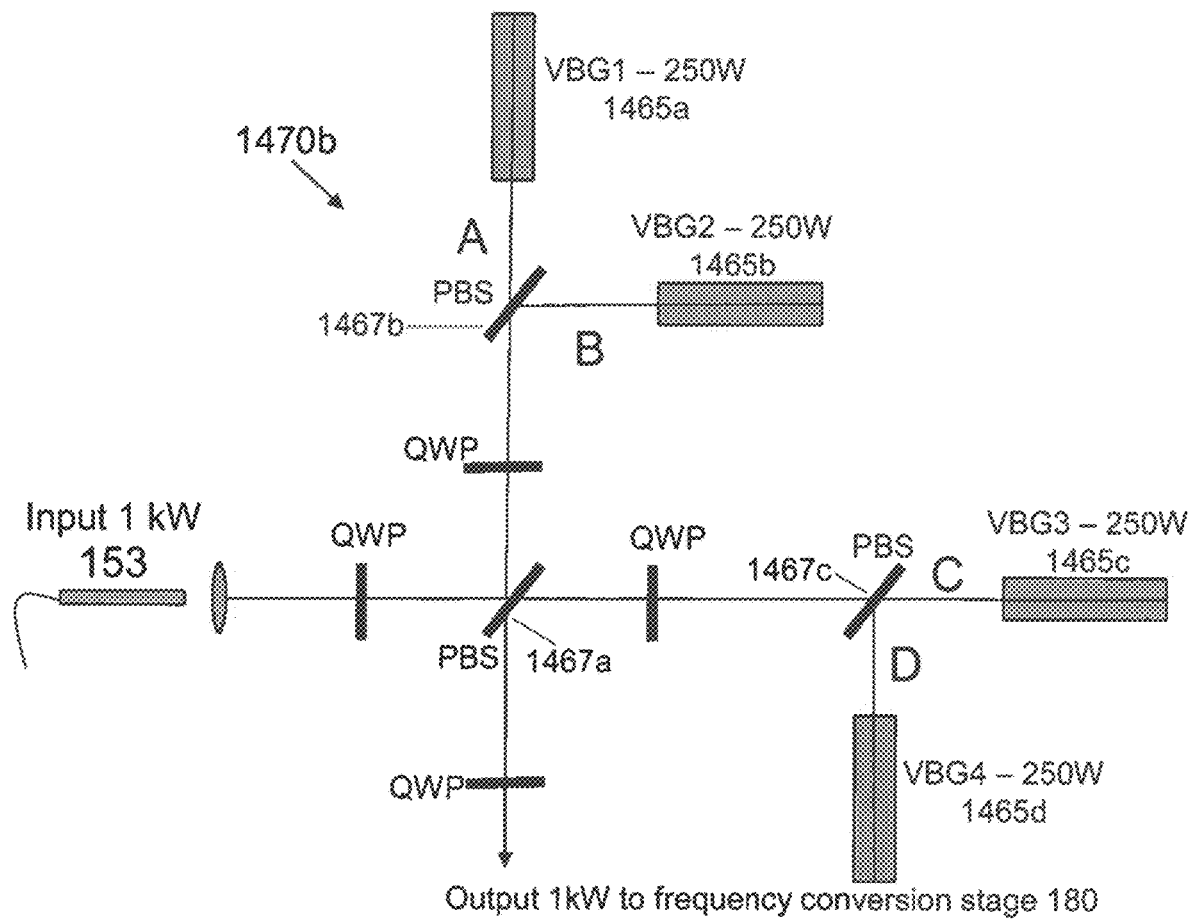
FIG. 14B is a schematic representation of another example pulse compressor in accordance with aspects of the invention.

FIGS. 14A and 14B show two non-limiting different implementations of this approach and are shown generally as pulse compressor 1470a in FIG. 14A and pulse compressor 1470b in FIG. 14B. In FIG. 14A, the amplified pulse beam 153 is passed through a polarization beam splitter (PBS) 1467b, which splits the beam 153 into two components, i.e., beam paths A and B, having equal energy. Each of these beam paths A and B are directed to respective VBGs 1465a and 1465b where they are compressed, and the reflected laser energy from each path is then recombined by a PBS 1467a and directed out to the nonlinear conversion stage 180. Using a 1 kW input laser energy as an example, light beam pathways A and B each direct 500 W of laser energy, which in this example is below a thermal lensing threshold for the respective VBGs. FIG. 14B is a similar configuration to FIG. 14A, but in this instance the original input laser energy is split into four beam paths A, B, C, and D, using polarization and beam splitters 1467a, 1467b and 1467c, and each light beam path supports 250 W of laser energy, which are then sent to four respective VBGs 1465a, 1465b, 1465c, and 1465d. The technique shown in FIGS. 14A and 14B also requires that the beam path lengths match one another, i.e., the path lengths for A and B match one another in FIG. 14A, and beam paths A, B, C, and D match one another in FIG. 14B. An alternative to the approach shown in FIGS. 14A and 14B is to split the beams based on wavelength using a wavelength division multiplexing (WDM) technique. One advantage to this approach is that the beam path lengths do not need to match one another.

Figure 10:
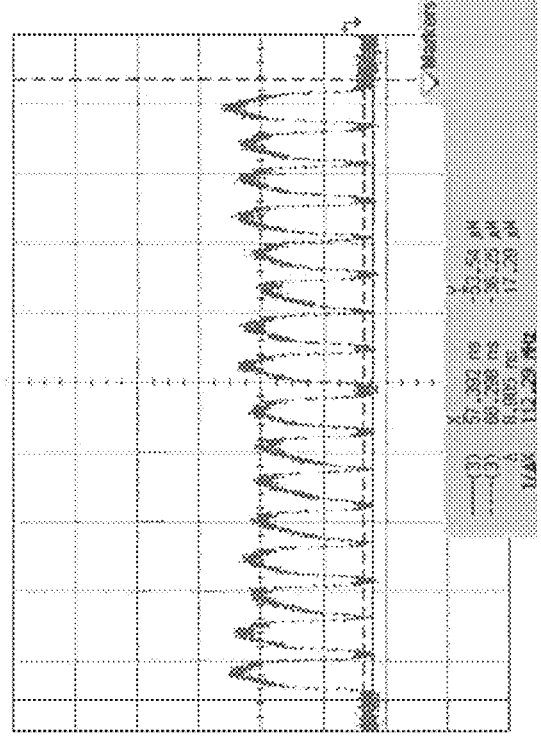
FIG. 10 illustrates a temporal plot of modified pulses being amplified and compressed prior to frequency conversion.
Figure 10:
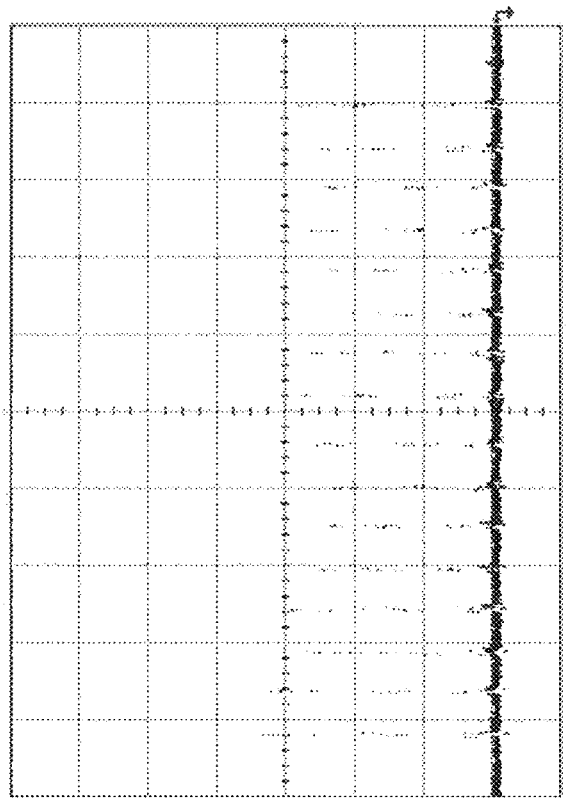

FIG. 10 shows temporal plots of one example of modified pulses 148 that are subsequently amplified in the amplification stage and then compressed. According to this example, modified pulses 148 with a 16 pulse burst, a 9 ns envelope, an average power of 1 mW, a pulse repetition rate of 11 MHz, and a pulse duration of 450 ps are amplified and compressed to have an average power (with the same 9 ns envelope) of 37 W, a pulse energy of 37 microjoules, a repetition rate of 1 MHz, and a pulse duration of less than 1.5 ps.

The amplified and compressed laser pulses 174 may be applied to the nonlinear frequency conversion stage 180 to generate UV light output. Nonlinear conversion stage 180 incorporates at least one nonlinear crystal (e.g., 182, 184) for the conversion of the input radiation 174 to higher harmonic frequencies. Non-limiting examples of nonlinear materials include crystals of lithium niobate $LiNbO_3$, lithium triborate (LBO), beta-barium borate (BBO), cesium lithium borate (CLBO), potassium dihydrogen phosphate (KDP) and its isomorphs, and lithium iodate ($LiIO_3$). Nonlinear crystal 182 can be an LBO crystal configured for second harmonic generation (SHG) conversion, which can be followed by nonlinear crystal 184 made from LBO and configured for third harmonic generation (THG).

Nonlinear conversion stage 180 may be used to generate either green or UV light. SHG crystal 182 converts the amplified and compressed IR light 174 at the fundamental wavelength 10xx nm (e.g., 1030 nm) to green light at a 5xx nm wavelength (e.g., 532 nm). THG crystal 184 converts the green light into UV light at a 3xx nm wavelength (e.g., 343 nm), which is indicated as output UV radiation 190 in FIG. 2. In accordance with various aspects, the nonlinear crystals 182 and 184 are configured to generate a conversion efficiency of at least 15%, and in some instances the conversion efficiency is at least 20%. In some configurations, the conversion efficiency is at least 25%. According to some embodiments UV radiation 190 has an average power of at least 200 W, and can be in a range of 50 W to 5 kW. In one embodiment, UV radiation 190 has an average power of 200 watts. Although UV light output is discussed here as a specific example, it is to be appreciated that the system may exclude the THG crystal 184 and output green light.

The following provides several non-limiting examples of system parameters for the laser light generator described herein.

According to one example, input radiation 112 is stretched to pulse durations of 1 ns in pulse stretcher 130 and replicated to a 1 GHz repetition rate by the pulse replicator, and the resulting modified pulse radiation 148 can be characterized as nearly continuous. This radiation can be amplified in amplifier 150 to 1 kW and higher and compressed by the pulse compressor 170 to pulses having a duration of 1 ps. This results in a peak power of ~1 MW at the output of the compressor, which is sufficient for conversion by the nonlinear frequency stage 180 to UV light having an average power of at least 200 W with greater than 25% conversion efficiency.

According to a second example, input radiation 112 may be stretched to pulse durations of 100 ps, and replicated to a 10 GHz repetition rate. Once amplified to at least 1 kW and recompressed to 1 ps pulse durations, the pulse peak power is on the order of ~100 kW, and with a conversion efficiency of at least 25%, the average power of the UV light is about 250 W.

According to a third example, input radiation 112 may be stretched to pulse durations of 2 ns, replicated to a 50 MHz repetition rate, and amplified to at least 1 kW, and the peak powers are on the order of 10 kW in the fiber power amplifier 150. When compressed to 1 ps, the peak power further increases to 20 MW with an energy per pulse of 20 microjoules. After frequency conversion to UV (with 25% conversion efficiency), the average power is on the order of 250 W, and the peak power can be 5 MW with an energy per pulse of 5 microjoules.

In accordance with at least one aspect of the invention, the pulse stretcher 130 is a tunable CFBG configured to stretch the input pulses 112 such that the pulse durations of compressed (and amplified) laser pulses 174 can be adjusted to be in a range of 1 ps to 25 ps. The tunable CFBG induces the desired pulse duration by changing its length, be it via thermal, mechanical, electrical, or magnetic means, and/or other methods known in the art. For example, changes to the CFBG can be induced by stretching the fiber, thereby changing the period of the index of refraction modulation. Heating the CFBG does the same through a change in the index of refraction profile. Non-limiting examples of CFBGs with thermal or strain (i.e., mechanical pulling) inducing techniques are discussed in PCT Application No. PCT/US20151014248 (hereafter the '248 application) and PCT Application No. PCT/US2018/025152 (hereafter the '152 application), each of which are owned by Applicant and incorporated herein by reference in their entirety.

According to one embodiment, a linearly chirped FBG uses both thermal and mechanical means to induce changes to the length of the fiber. For example, a "coarse" pulse duration tuning can be achieved by heating selected portions of the CFBG, and "fine" pulse duration tuning can be achieved using a piezoelectric element. Such a combination allows for a more robust tuning capability over conventional CFBGs configured with only one of the stretching mechanisms. For instance, the coarse tuning mechanism may be performed first, followed by fine tuning.

Figure 11A:
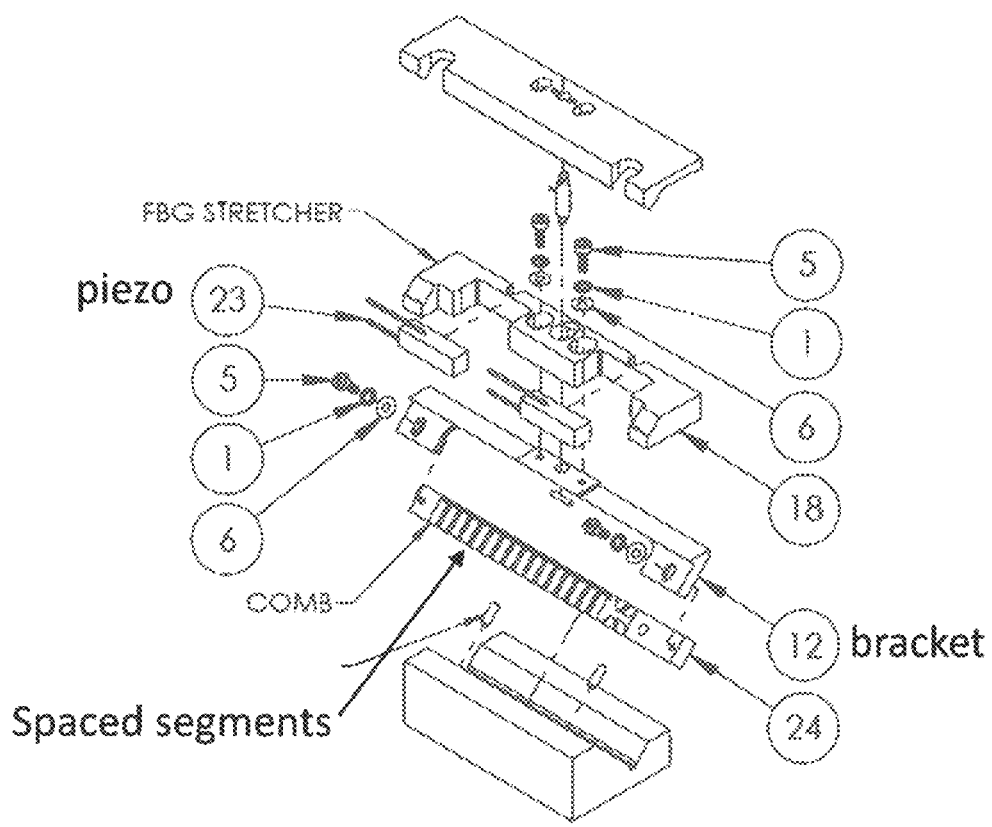
FIGS. 11A-11C show one example of a CFBG pulse stretcher in accordance with aspects of the invention.
Figure 11C:
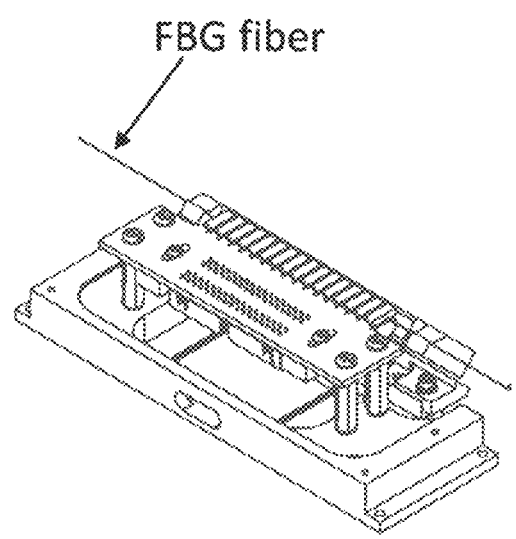
Figure 11B:
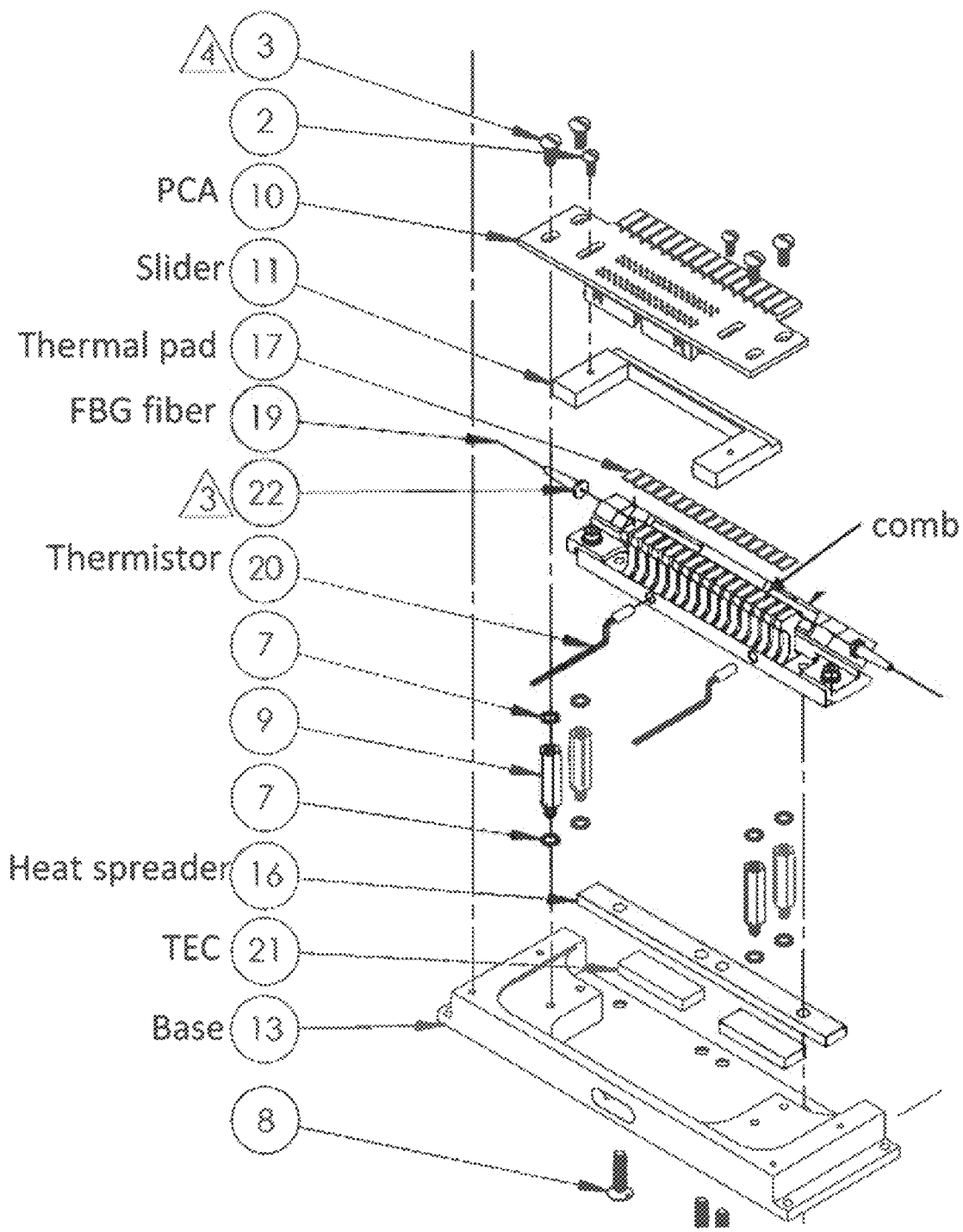

One example of a 16 channel CFBG stretcher having both thermal and mechanical mechanisms for changing the length of the fiber is shown in FIGS. 11A-11C. FIGS. 11A and 11B feature a 16 channel perturbation comb having some of the same functionality as at least one example discussed in the '152 application. FIG. 11C shows the assembled CFBG device. The comb is configured with a plurality of (16) spaced segments corresponding to respective frequencies. The comb may be constructed from a single piece of heat conducting material (e.g., stainless steel), and includes a base supporting the spaced segments. The FBG fiber is placed in aligned recesses formed in respective upper portions of the segments. Coarse tuning control is accomplished via resistor heaters and temperature sensors (not shown in the Figures) that are coupled to respective segments of the comb to independently control the temperatures of each segment. Individual resistors are selectively actuated by a controller (not explicitly shown in the Figures), which in turn apply heat to the respective segments, thereby inducing change to the refractive index of the FBG fiber. Two thermistors provide additional temperature measurement and control. At least one thermoelectric cooler is also included and is thermally coupled to at least a portion of the segments to provide thermal stabilization and speed in cooling of the segments.

A pair of piezoelectric transducers induce mechanical strain to the fiber of the FBG and are also included in the structure for purposes of implementing fine tuning capability to the segments. The piezoelectric actuators are also controlled by the controller and have similar functionality as those described in the '248 application. The adjustment of the pulse duration is implemented with a mechanical flexure mount that holds the FBG fiber. The piezos are located in positions to maximize the stretching of the FBG about flexure or pivot points. The piezo displacement is multiplied at the fiber by pivoting about the pivot points in the mount. In the example shown in FIGS. 11A-11C, the pivot points are positioned close to semicircular cutouts at the bottom of the mount. This is in contrast to conventional piezo-based structures that are more directly coupled to the fiber, which have a limited displacement and therefore require the use of nonlinearly chirped FBG. Much larger changes in the length of the FBG are therefore feasible using the disclosed structure over the more conventional designs. According to one example that implements the use of a linearly chirped FBG with a 6 nm bandwidth, the pulse duration can be tuned by the disclosed structure from 400 fs to 1.5 ps with a switching time of less than 100 microseconds. This capability is useful in certain applications such as annealing, including OLED annealing, where there are narrow process windows and the ability to adjust the pulse duration with fine resolution provides multiple processing advantages.

It is to be appreciated that although the example shown in FIGS. 11A-11C is configured with 16 channels, other configurations are also encompassed by this disclosure, such as 32 channel (or larger or smaller) configurations. The CFBG device is capable of being scaled for a particular application.

Figure 12A:
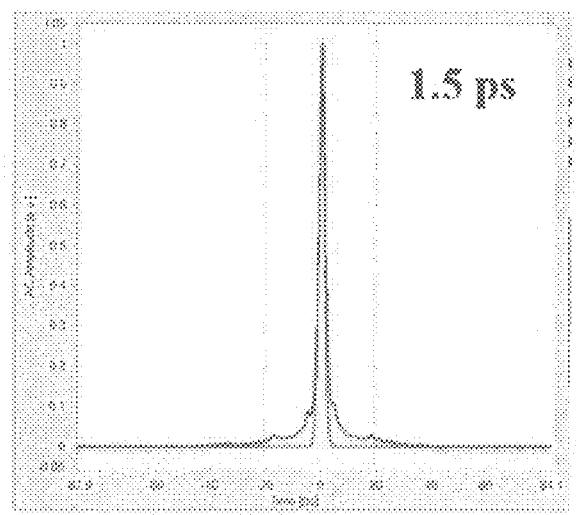
FIGS. 12A-12F show examples of compressed pulses tuned to have a duration in a range of 1 ps to 25 ps using a pulse stretcher component of a fiber-based laser system in accordance with aspects of the invention.
Figure 12B:
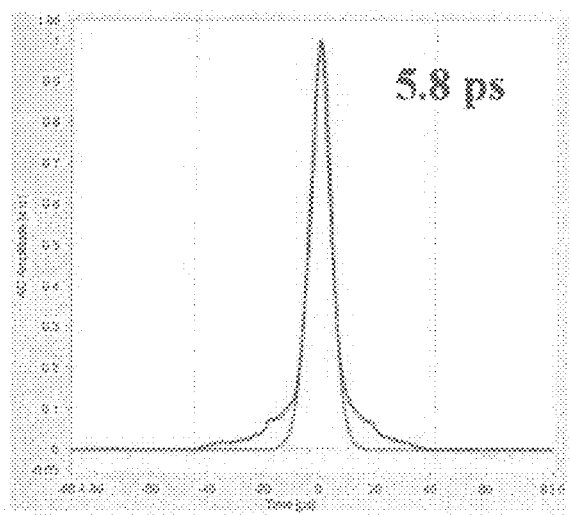
Figure 12C:
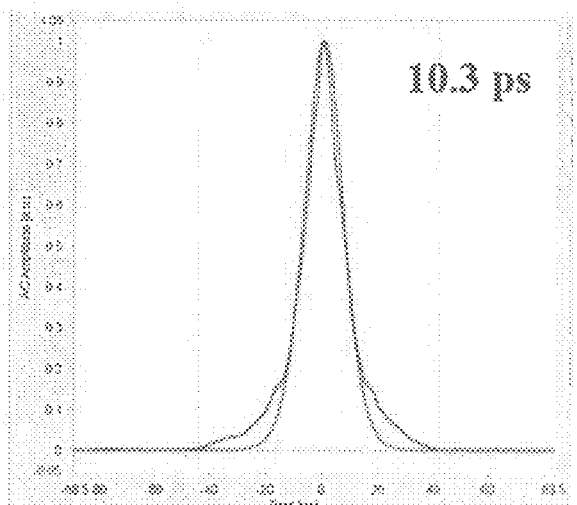
Figure 12D:
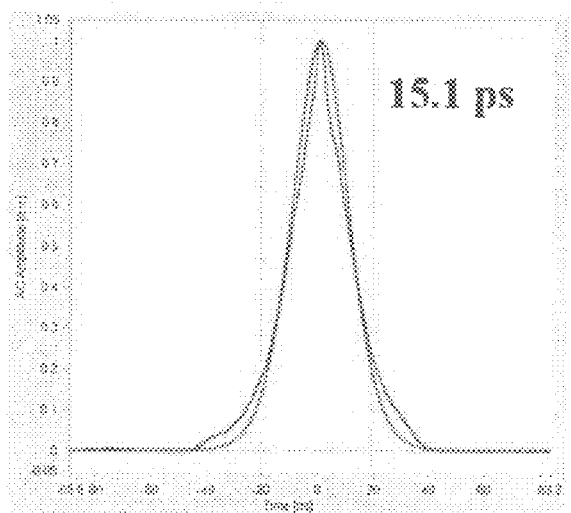
Figure 12E:
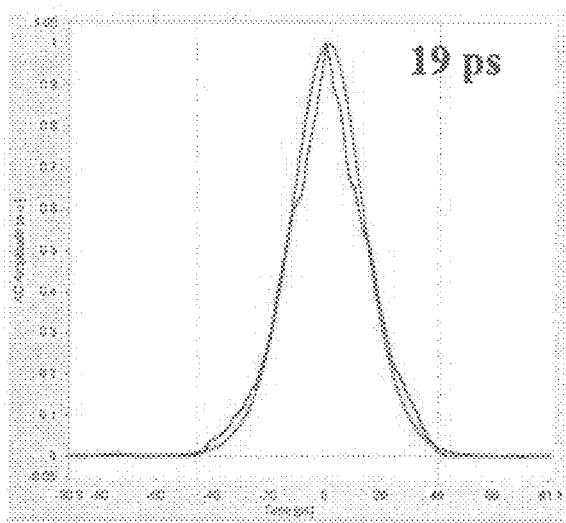
Figure 12F:
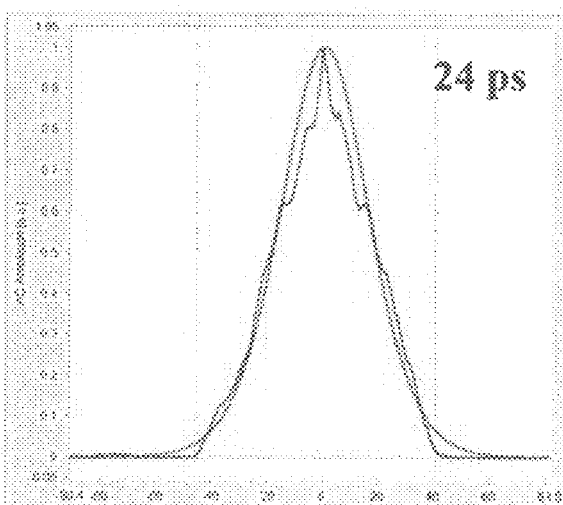

FIGS. 12A-12F show temporal profiles of six separate experimental results obtained using a CFBG stretcher 130 similar to that shown in FIGS. 11A-11C, but configured as a 32 channel (100 mm FBG) and with a 6 nm bandwidth. The CFBG stretcher 130 is configured to stretch the input pulses 112 such that compressed pulses 174 exiting the pulse compressor 170 have a pulse duration of 1.5 ps (FIG. 12A), 5.8 ps (FIG. 12B), 10.3 ps (FIG. 12C), 15.1 ps (FIG. 12D), 19 ps (FIG. 12E), and 24 ps (FIG. 12F). Each temporal profile indicates both raw measurement data and an associated fitted curve. Such tunability is important in controlling the pulse peak power in annealing applications, where frequency conversion is used to achieve green or UV light energy. Increasing the length of the laser pulse provides for the ability to reduce the pulse peak power without substantial loss in the average power of the pulse. Fine tuning capability, and particularly fast fine tuning capability (as described herein) combined with proper feedback control allows for optimized material modification processing. Precise amounts of energy can therefore be delivered to the material for purposes of creating a uniform modified material. Feedback can be provided via various parameters, including temperature, wavelength, and/or dispersion (e.g., second order dispersion) measurements.

According to some embodiments, the UV (or green) light radiation 190 may be passed through at least one additional pulse replicator module to further increase the repetition rate and/or an additional amplification stage for additional amplification. In the alternative, the peak power of the output UV light can be reduced by implementing the use of a second pulse stretcher positioned downstream from the frequency conversion stage 180. According to some embodiments, a pulse replicator module may also be used between amplification stages (prior to frequency conversion).

As mentioned above, the mode-locked laser source 110 can be configured as a passively mode-locked fiber ring cavity. This configuration includes at least one component in the ring cavity that has a nonlinear response to increasing peak intensity. According to at least one embodiment, the mode-locked laser source 110 is configured as a passively mode-locked fiber ring cavity configured to generate subnanosecond giant chirped pulses. The ring fiber waveguide or cavity includes multiple fiber amplifiers, chirping fiber components, and spectral filters configured with spectral band passes that are centered around different central wavelengths so as to provide leakage of light along the ring cavity in response to nonlinear processes induced in the ring cavity. The filters work in combination with one another to produce a nonlinear response, which enables a stable mode-locked mode of operation. One example of such a configuration is described in co-owned, co-pending U.S. application Ser. No. 15/536,170, now U.S. Pat. No. 10,193,296 titled "PASSIVELY MODE-LOCKED FIBER RING GENERATOR," which is incorporated herein by reference and referred to herein as "the '170 application."

Figure 13:
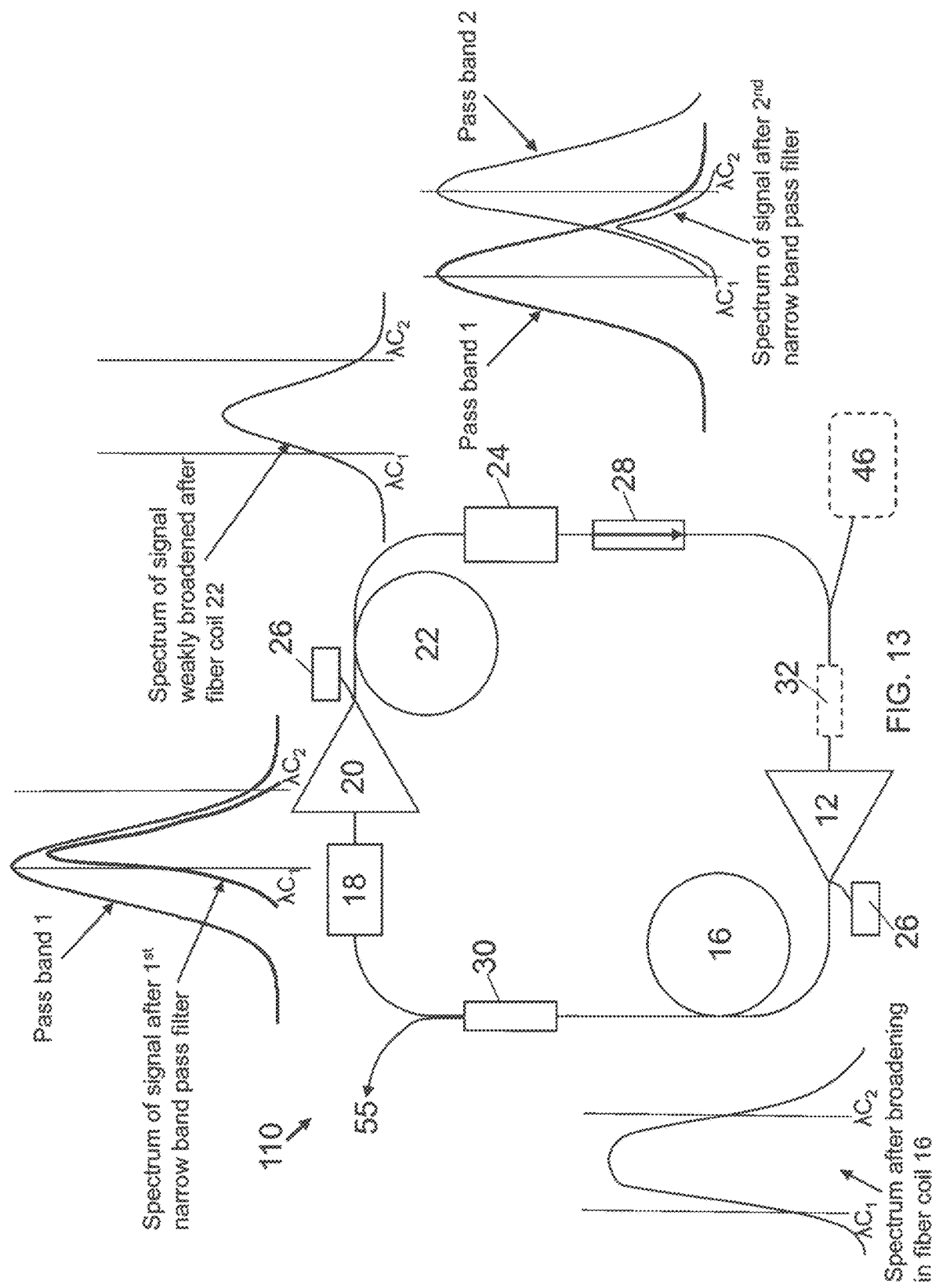
FIG. 13 is a schematic representation of one example of a passively mode-locked fiber laser in accordance with aspects of the invention.

FIG. 13 is a schematic representation of the pulse generator described in the '170 application and is an example of a mode-locked laser source 110 suitable for embodiments of the invention. The all-fiber architecture lends the laser source 110 environmental stability and is configured as a ring fiber waveguide or cavity guiding light in one direction. A fiber isolator 28 provides the desired directionality of light propagation within the ring fiber waveguide. The ring cavity is configured such that the output of one of first fiber amplifier 12 and second fiber amplifier 20 seeds the other fiber amplifier. Between the first and second amplifiers 12 and 20 two or more identical groups or chains of fiber elements are coupled together to define the ring cavity. Besides the fiber amplifier, each chain includes a fiber coil 16, 22 which provides respective periodic spectral and temporal broadening of the signal, and narrow line filters 18, 24 that are operative to spectrally filter the broadened signal. The whole ring laser cavity thus includes two cavities, linear sub-cavities, providing very weak seed one to another. The whole ring laser cavity has no longitudinal modes because of strong attenuation of the signal within the range of transmittance of both filters, which is needed for discrimination against spontaneous CW lasing.

The overall architecture is described here in more general terms, with more description included below. One of the fiber amplifiers 12, 20 is configured to provide much higher gain than the other amplifier. The higher pumped amplifier creates conditions for strong pulse broadening due to SPM, making the pulse positively chirped and having a broad and smooth spectrum. This spectrum fills completely the pass band of the filter located downstream from it, so that its replica evolves in the cavity afterwards. The other, lower pumped amplifier ensures stable performance, i.e., to lock the laser in a stable equilibrium state when small deviations from this state create an action returning it to the target state. The spectrum reaching the filter downstream from the lower pumped amplifier does not fill the pass band of this filter completely, which creates the force returning the laser to the target state when a deviation happens. In order for the laser pulse to circulate and evolve within the ring cavity, its intensity must be sufficient for the pulse to experience nonlinear spectral broadening and recover intensity after each pass along the cavity. The combination of the two filters 18, 24 having weak spectral overlap works as an effective saturable absorber. Weak spectral overlap allows discrimination against CW in favor of a pulse having sufficient intensity for spectral broadening. When the peak intensity reaches the level sufficient to broaden the pulse spectrally, the losses for the newly acquired spectral components drop as these components are spreading toward the center of the filter pass band. It is to be appreciated that stable and reproducible circulation of the pulse along the cavity may occur without any spectral overlap of the filters 18, 24, but overlap can allow for case in starting the laser pulsing.

The filters 18 and 24 are each configured to pass only a desired spectral range and, if needed, introduce either a normal or anomalous dispersion. One of the filters may be configured with a bandpass which is at most five (5) times broader than the bandpass of the other filter. Furthermore, the bandpass of each of the filters can be from 2 to 10 times narrower than that of output pulse 55. However, in some cases, the desired pulse width can be narrower than the bandpass of the filters. The sequence of spectral broadening and filtering generates pulses with a giant chirp having a desired spectral width, pulse duration, and energy.

The ring waveguide further includes an output coupler 30 positioned immediately downstream from fiber coil 16 that guides the chirped pulse 55 outside the ring waveguide. To create the desired population inversion in a gain medium of the amplifiers, i.e., to start the operation of the pulse generator, one or two CW pumps 26 are optically coupled to the respective amplifiers. All of the above-discussed components are interconnected by single transverse mode (SM) fibers.

During start-up, spontaneous emission generated in response to etalon pulses launched from artificially induced noises by pumps (or optionally from external seed source 46 via input coupler 32) is amplified in the first fiber amplifier 12. This spontaneous emission is within a desired spectral range which is characterized by a CW component and pitch component(s). Propagating through the first fiber coil 16, the pitch is somewhat spectrally and temporally broadened and further spectrally filtered in first filter 18. For instance, a long wavelength sub-region of the pitch is filtered out from further propagation in the desired direction. The filtered pulsed component is further amplified in second amplifier 20 to a peak intensity sufficient to induce a self-phase modulation (SPM) nonlinear effect while propagating through the second fiber coil 22. The SPM is manifested by spectral and temporal broadenings of the pulsed component which is manifested by generation of new frequency components or modes around a center component. Some of the newly generated frequency components partially overlap the frequency bandpass of the second filter 24 which, in contrast to the first filter 18, cuts off the short wavelength sub-region of the pitch. The generation of new spectral components becomes possible only at certain peak intensities of pitches, i.e., pitches with synchronized modes, sufficient to induce a self-phase modulation phenomenon. The circulation of the pitch may continue through the first group of the first amplifier 12, fiber coil 16 and filter 18 combination configured again to respectively amplify, spectrally and temporally broaden and finally filter out the developing pulsed component. The thus developing pitch is finally amplified in the second amplifier 20 to the desired peak intensity which is instrumental in such a broadening of the pitch that it fully covers the bandpass of the second filter 24. At this point, the pitch spectrally develops to the desired signal with a somewhat reduced peak intensity lost in the second filter 24 but fully compensated in the following first amplifier 12. The predetermined percentage of subsequent spectrally and temporally expanded signal in the first fiber coil 16 is guided outside the ring waveguide as a pulse with the desired spectral width, intensity and energy.

In a steady self-starting regime of generation of dissipative solitons or similaritons, the pulse generator shown in FIG. 13 operates in a similar manner to other ring architectures, such as NOLM/NALM and NPR, each having an individual nonlinear element. This is because in the stable regime, such a nonlinear element does not substantially affect the evolution of a pulse, but is necessary only for the pulse formation from noise. However, in the stable regime the pulse generator is operative to output the desired chirped pulse at most once each round trip, which is in contrast to linear cavities where signal light repeatedly passes through the cavity. The realization of such an output includes either one output coupler 30 positioned immediately downstream from either of fiber coils 16 and 22 or two output couplers which are located immediately downstream from respective fiber coils 16 and 22. In case of two output couplers, the chirped pulse is coupled out of the ring waveguide each half a round trip.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A fiber-based laser system comprising:
   a mode-locked laser source configured to provide an input train of input pulses having an initial pulse duration of less than one nanosecond and a pulse repetition rate of at least one MHz;
   an optical pulse stretcher optically coupled to the mode-locked laser source and configured to stretch pulse durations of the input train of input pulses to produce a train of stretched laser pulses;
   a pulse replicator module optically coupled to the optical pulse stretcher and configured to increase a pulse repetition rate of the train of stretched laser pulses to produce a modified pulse train of laser light;
   a fiber power amplifier optically coupled to the pulse replicator module and configured to amplify the modified pulse train to produce amplified laser pulses, the amplified laser pulses having a peak-average-power ratio of less than 30; and
   a pulse compressor optically coupled to the fiber power amplifier and configured to temporally compress the amplified laser pulses to produce amplified and compressed laser pulses.

2. The system of claim 1, further comprising at least one nonlinear frequency conversion stage optically coupled to the pulse compressor and configured to receive the amplified and compressed laser pulses for frequency conversion, wherein the nonlinear frequency conversion stage is configured to have a conversion efficiency of at least 15%.

3. The system of claim 2, wherein the at least one nonlinear frequency conversion stage outputs ultraviolet (UV) laser light having an average power of at least 200 watts.

4. The system of claim 1, wherein the input train of pulses have an initial pulse duration in a range of 10 fs to 100 ps and the amplified and compressed laser pulses have a pulse duration shorter than the initial pulse duration.

5. The system of claim 1, wherein the optical pulse stretcher is configured to stretch the initial pulse duration such that the amplified and compressed laser pulses have a duration in a range of 1 ps to 25 ps.

6. The system of claim 1, wherein the mode-locked laser source is configured as a passively mode-locked fiber ring cavity.

7. The system of claim 6, wherein the passively mode-locked fiber ring cavity is configured to generate giant chirped pulses as the input pulses.

8. The system of claim 1, wherein the pulse replicator module includes at least two fused fiber optic couplers that comprise an input fused fiber optic coupler, an output fused fiber optic coupler, and at least one optical fiber delay line disposed between the input and output fused fiber optic couplers.

9. The system of claim 8, wherein the pulse replicator module includes a plurality of stages that each include an optical fiber delay line such that each successive stage introduces a time delay to the modified pulse train, and a train of time-delayed replica pulses is provided as the modified pulse train at an output of the output fused fiber optic coupler.

10. The system of claim 1, wherein the optical pulse stretcher is configured to stretch the initial pulse duration to a pulse duration on the order of a few nanoseconds, and the amplified and compressed laser pulses have a pulse duration shorter than the initial pulse duration.

11. The system of claim 1, wherein the pulse replicator module is configured to increase the pulse repetition rate of the train of stretched laser pulses to tens of MHz and multi-GHz levels.

12. The system of claim 1, wherein the pulse compressor comprises at least one beam splitter and at least two volume Bragg gratings (VBGs).

* * * * *